(12) United States Patent
Bill et al.

(10) Patent No.: US 11,740,913 B2
(45) Date of Patent: Aug. 29, 2023

(54) METHOD AND USER INTERFACE FOR DATA MAPPING

(71) Applicant: salesforce.com, inc., San Francisco, CA (US)

(72) Inventors: Christopher Bill, Indianapolis, IN (US); Steven Kostrzewski, Novato, CA (US); Sarah Flamion, Newburgh, IN (US)

(73) Assignee: Salesforce, Inc., San Francisco, CA (US)

( * ) Notice: Subject to any disclaimer, the term of this patent is extended or adjusted under 35 U.S.C. 154(b) by 0 days.

(21) Appl. No.: 17/162,562

(22) Filed: Jan. 29, 2021

(65) Prior Publication Data

US 2021/0149695 A1 May 20, 2021

Related U.S. Application Data

(63) Continuation of application No. 16/037,435, filed on Jul. 17, 2018, now Pat. No. 10,936,342.

(51) Int. Cl.
*G06F 17/00* (2019.01)
*G06F 9/451* (2018.01)
*G06F 3/0482* (2013.01)
*G06F 3/04842* (2022.01)

(52) U.S. Cl.
CPC ............ *G06F 9/451* (2018.02); *G06F 3/0482* (2013.01); *G06F 3/04842* (2013.01)

(58) Field of Classification Search
CPC ..... G06T 11/206; G06T 17/00; H04L 43/045; H04L 41/22; H04L 41/0266; H04L 45/18; G06F 16/212; G06F 16/211; G06F 16/258; G06F 9/451; G06F 3/0482; G06F 3/04842
USPC ........................................................ 715/762
See application file for complete search history.

(56) References Cited

U.S. PATENT DOCUMENTS

| 6,237,006 B1 * | 5/2001 | Weinberg ............... G06Q 30/02 714/E11.181 |
| 8,560,494 B1 * | 10/2013 | Downing .............. G06F 16/211 707/726 |
| 10,936,342 B2 | 3/2021 | Bill et al. |
| 2006/0150169 A1 * | 7/2006 | Cook ........................ G06F 8/34 717/156 |

(Continued)

*Primary Examiner* — Jason T Edwards
(74) *Attorney, Agent, or Firm* — Sterne, Kessler, Goldstein & Fox P.L.L.C.

(57) ABSTRACT

Embodiments of apparatus, systems, and methods are described for creating, arranging, and displaying data mappings between two different data schemas in a graphical user interface (GUI). The GUI allows scaling of a data schema, automatic data sorting and grouping of objects in a schema, dynamic spacing of data mappings in the GUI, and customizable data map transformations to entities of a canonical data model. The GUI can limit the display of objects and fields to those that have been mapped into entity groups. The GUI can display mapped or unmapped fields to facilitate the mapping of additional fields or objects. The GUI displays visual logic connectors between objects and entities to summarize the relationship and number of mappings between the objects and entities. Objects and entities can be expanded and collapsed to show more granular relationship information. Instance-enabled canonical entities can be created to conceptually group fields.

20 Claims, 31 Drawing Sheets

(56) References Cited

U.S. PATENT DOCUMENTS

| | | | |
|---|---|---|---|
| 2008/0162532 A1* | 7/2008 | Daga | G06F 16/248 |
| | | | 707/999.102 |
| 2008/0168352 A1 | 7/2008 | Mehrotra | |
| 2009/0037848 A1* | 2/2009 | Tewari | G06Q 30/06 |
| | | | 715/835 |
| 2009/0122065 A1* | 5/2009 | Patil | G06Q 10/00 |
| | | | 345/440 |
| 2009/0198562 A1* | 8/2009 | Wiesinger | G06Q 30/02 |
| | | | 345/441 |
| 2010/0060643 A1* | 3/2010 | Kolipaka | G06T 11/206 |
| | | | 345/440 |
| 2010/0079460 A1* | 4/2010 | Breeds | G06F 16/26 |
| | | | 345/440 |
| 2010/0079462 A1* | 4/2010 | Breeds | G06T 11/206 |
| | | | 345/440 |
| 2011/0055147 A1* | 3/2011 | Joerg | G06F 9/4843 |
| | | | 707/602 |
| 2012/0246519 A1 | 9/2012 | Savov | |
| 2013/0046789 A1 | 2/2013 | Lulewicz | |

\* cited by examiner

Data Mapping

Showing all Canonical Model Attributes and Entities from Customer

DATA SOURCE SCHEMA — 402  NUMBER OF MAPPINGS — 410  CANONICAL DATA MODEL — 406

Select a Data Source ▼ — 404

| NTO Retail<br>Last Edited: Never |
| NTO Service Desk Europe<br>Last Edited: Never |
| NTO Service Desk Global<br>Last Edited: Never |
| ✓ NTO Service Desk New York<br>Last Edited: Today at 10:34AM |

Select an Entity Group ▼ — 408

| ✓ Contact Point<br>Last Edited: Never |
| Party<br>Last Edited: Never |
| Return Order<br>Last Edited: Never |
| Sales Order<br>Last Edited: Never |
| Shipment Order<br>Last Edited: Never |

[Find Entity, Object, Attribute, or Field] — 412

ⓘ Begin Data Mapping

Data Mapping
Showing all Canonical Model Attributes and Entities from Consumer — 1900

DATA SOURCE DETAILS

Contact — 1910
Below are all the attributes for the selected object. You can add additional ones here.

Find Field — 1916

| Visible | Attribute Label — 1908 | Data Type — 1912 | System Attribute — 1914 |
|---|---|---|---|
| ☐ | Account Address | Formula (Text) | True |
| ☐ | Account Name | Lookup (Account) | True |
| ☐ | ActiveLiveAgentUser | Checkbox | False |
| ☐ | Active Camper Score | Number | False |
| ☐ | Activity Indicator | Formula (Text) | True |
| ☐ | Added from Data.com | Formula (Number) | True |
| ☐ | Allow Customer Portal Self-Registration | Checkbox | True |
| ☐ | Assistant | Text (40) | True |
| ☑ | Asst. Phone | Phone | True |
| ☐ | Birthdate | Date | True |
| ☐ | Certification Level | Picklist | False |
| ☐ | Clean Status | Picklist | False |
| ☐ | Contact Location | Formula (Text) | True |
| ☐ | Contact Owner | Lookup (User) | True |
| ☐ | Contact Record Type | Record Type | True |
| ☐ | Created By | Lookup (User) | True |
| ☐ | Data.com Does Not Auto-Update | Checkbox | True |
| ☐ | Data.com Key | Text (20) | True |
| ☐ | Data.com Managed | Formula (Number) | True |

1906

DATA SOURCE SCHEMA — 1904

NTO Service Desk New York

∨ Contact — 1902
- Salutation
- First Name
- Last Name
- Title
- Email
- Phone
- PhoneExt
- OtherPhone
- HomePhone
- AsstPhone
- Mobile
- More...

> Account

+ Add Objects to Canvas

All Changes Saved
Find Entity, Object, Attribute, or Field

Close

FIG. 19

Data Mapping
Showing all Canonical Model Attributes and Entities from Consumer

Retail Canonical Schema | Canonical Details

Individual — 2102

Here you can see additional details about the canonical and show additional fields.

Find Attribute — 2116

| Visible | Attribute Label | Data Type | Description |
|---|---|---|---|
| ☐ | IndividualId | ID | Unique ID for a customer |
| ☐ | PersonId | ID | |
| ☐ | PhotoURL | String | |
| ☐ | PersonName | String | Salutation of the customer's name |
| ☑ | FirstName | String | Start of the customer's name |
| ☐ | MiddleName | String | Middle of the customer's name |
| ☑ | LastName — 2122 | String | A customer's last name |
| ☐ | SecondFamilyName | String | |
| ☐ | NameSuffix | String | |
| ☐ | OfficialName | String | |
| ☐ | MailingName | String | |
| ☐ | OrderingName | ID | |
| ☐ | NickName | String | |
| ☐ | ResidenceCountry | String | |
| ☐ | BirthDate | Date / Time | |
| ☐ | Don'track | String | |
| ☐ | DoNotTrackUpdateDate | String | |

Consumer ▼ — 2106
∨ Individual — 2104
- Salutation
- First Name
- Last Name
- Birth Date
- Edit List CONTACT POINTS
- > Email: Contact
- > Phone: Contact
- > Phone: Other
- > Phone: Home
- > Phone: Assistant
- > Phone: Mobile
- > Phone: Account
- > Address: Account

FIG. 21

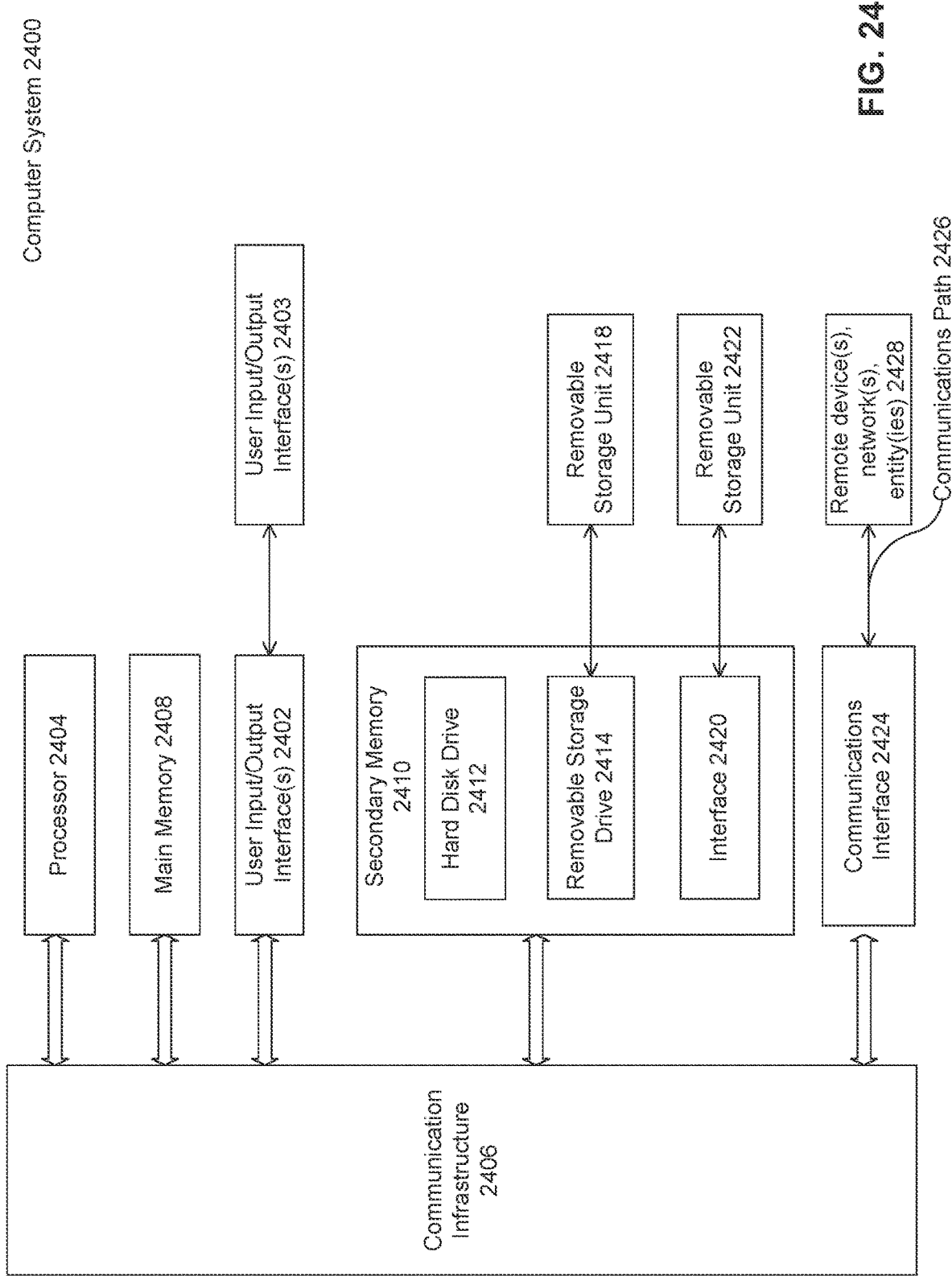

METHOD AND USER INTERFACE FOR DATA MAPPING

CROSS-REFERENCE TO RELATED APPLICATIONS

This application is a continuation of U.S. application Ser. No. 16/037,435, titled "Method And User Interface For Data Mapping," filed on Jul. 17, 2018, which is incorporated herein by reference in its entirety.

TECHNICAL FIELD

Embodiments included herein generally relate to a method and user interface for data mapping between data schemas.

BACKGROUND

Companies have access to more data about their customers than ever before. An objective of a customer relationship management (CRM) system is to efficiently manage and be able to easily access and share this data at all levels of service within a supply chain. Data from multiple supply chain systems can be integrated to allow intelligent, fast, personalized service to customers in any channel of a supply chain.

However, problems arise in integrating data that may have different semantics or applications in various supply chain channels. This is especially the case for data that traditionally may be siloed in disparate systems, such as multiple legacy systems, that do not traditionally talk to each other. But with an integrated data schema, a single customer view can be created across every department of a business, including sales, service, marketing, IT, research and development, and more.

An agile layer of data can be a unifying link between various business systems as well as third-party back-end systems that require access to the same data. Unified data, in an integrated cloud, for example, can provide increased visibility into a customer landscape and can make customer service easier to manage. Furthermore, providing the ability to manipulate unified data into multiple different data schemas for customizable use at each service level or department allows each service level or department to optimally perform its unique functions.

A vast amount of information must be managed in a unified system, but it is not practical or necessary to combine all of the data, some of which is unique to a specific service channel, into one database view. Rather, similar or closely related data can be associated between systems using data mappings to create clear and accurate references between systems. A canonical data schema containing thousands of data entities and attributes can be created.

The vast amount of potential data makes such a canonical data schema extremely complex for users to navigate. Data mappings may be so complex as to render the mappings difficult to isolate, arrange, and manipulate in a user interface. Subsequently, the resulting data can be difficult for users to understand or decision makers to leverage. A user interface is needed that makes complex data mappings understandable at a glance, with scalable views of the data. Users need the ability to sort, group, and arrange data optimally on the canvas of a graphical user interface (GUI) for a user's unique purpose.

BRIEF DESCRIPTION OF THE DRAWINGS

The accompanying drawings, which are incorporated herein and form part of the specification, illustrate the present embodiments and, together with the description, further serve to explain the principles of the present embodiments and to enable a person skilled in the relevant art(s) to make and use the present embodiments.

FIG. 4 illustrates a Data Mapping GUI in an empty state, at the start of a mapping process, according to some embodiments.

FIG. 19 illustrates a Data Mapping GUI screenshot showing an exemplary interface for adding fields to a data source schema based on available object attributes, according to some embodiments.

FIG. 21 illustrates a Data Mapping GUI screenshot showing an exemplary interface for adding existing attributes as new fields to the displayed canonical data model on the GUI canvas, according to some embodiments.

FIG. 24 illustrates an example computer system useful for implementing various embodiments.

Figure 1:
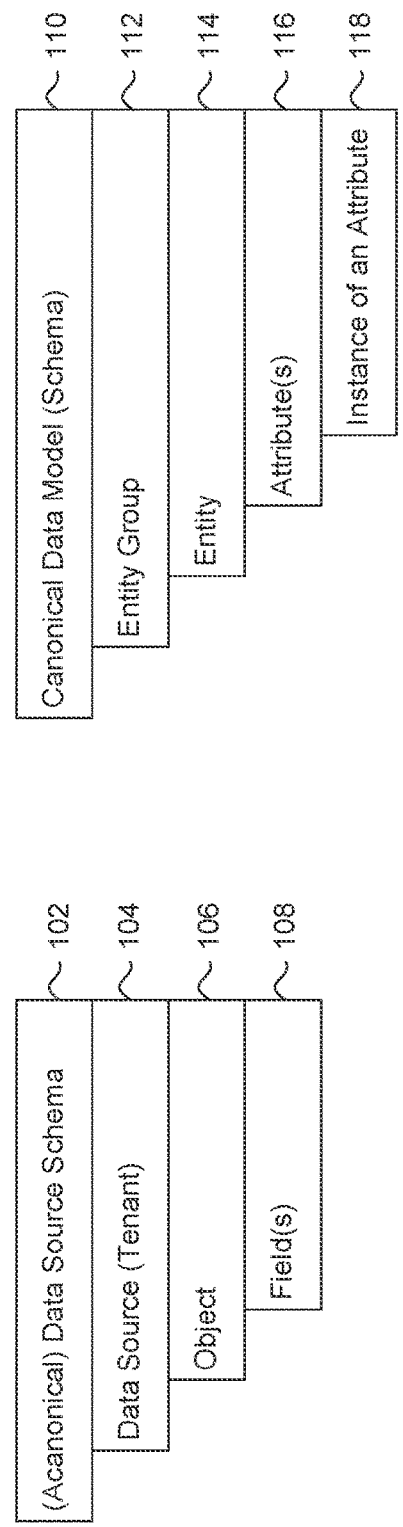
FIG. 1 illustrates a hierarchical relationship between the elements in data schemas, according to some embodiments.

The features and advantages of the present embodiments will become more apparent from the Detailed Description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

SUMMARY OF THE EMBODIMENTS

Apparatus, system, article of manufacture, method, and/or computer product embodiments, and/or combinations and sub-combinations thereof, are described herein for data mapping between data schemas.

Some embodiments of a method include using a graphical user interface (GUI) of a computing device to provide simultaneous views of a first data schema and a second data schema, within a customer relationship management (CRM) database, for example. The method enables a first mapping of a first object of the first data schema to a second object of the second data schema. Using the method, the user can make any number of subsequent mappings. The method displays, within the GUI, a visual logic connector of the first mapping of the first object of the first data schema to the second object of the second data schema. Subsequent mappings are displayed, each with a unique visual logic connector.

The method further includes ordering of the displayed mappings, including the first object of the first data schema and the second object of the second data schema, as well as subsequent mappings, to reduce visual complexity of the visual logic connectors of the mappings. For example, reduction of visual complexity may be achieved by reducing the amount of complexity of overlap of the visual logic connectors. Reduction of visual complexity can also be achieved by grouping mappings and by locating the mappings within groups as close to each other as possible. The method can reorder and redisplay mappings, including automatically in some embodiments, using an algorithm that minimizes visual complexity. In some embodiments, the method allows the user to expand and collapse sections of a schema within the GUI to focus attention on the data mappings and groupings of interest.

Some embodiments of the GUI, implemented by a computer-readable device within a computer system, are also described. A data mapping component of a GUI, specifically a Data Mapping GUI, is used to map one data schema to another, for example, a first data schema to a second data schema in one embodiment, a local data schema to a global data schema in another embodiment, or a unique or acanonical data schema to a canonical data schema, serving as a canonical data model, in yet another embodiment. The Data Mapping GUI can map multiple data objects (also called "tenant objects," as they are specific to a user or department using the schema) and fields to multiple canonical entities and attributes.

This Summary is provided merely for purposes of illustrating some example embodiments to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

DETAILED DESCRIPTION

Using the Data Mapping GUI disclosed herein, a user can select data fields, map fields, and define transformation rules for mappings between data fields of two data schemas. The transformation rule of a mapping establishes the logical conditions under which one field, for example, object, entity, or group, of a mapping can be derived from another field of the mapping. The same or a similar transformation rule of a first mapping can be used for other mappings to create similar mappings based on the first mapping.

In this specification, "canonical" refers to a standard form or a standard way of representing an order or structure of data, such as for an object or list of objects in software. Herein, "canonical" may be used to describe a canonical data schema generically or more specifically describe a canonical data model that provides a template for other data schemas. In contrast, "acanonical" refers to a representation such that an order or structure of data has a unique, or non-standard, representation, such as for a tenant-specific data source schema. The Data Mapping GUI disclosed herein can differentiate between acanonical and canonical fields of a data schema, such as between custom fields and standard fields, or between custom fields and required fields, for example.

Because a canonical schema can contain thousands of entities and attributes, a canonical schema can have several levels of groupings to help the user view and understand the data structure, including mappings and relationships, and to help the user further use and customize the structure according to the user's business purpose. For example, a user can group objects within the Data Mapping GUI by business classification, such as by party, project, or order. Transformation rules can also be customized for this purpose.

The Data Mapping GUI can overcome scale issues when a user selects objects or fields, such that a user, regardless of the size of objects or fields, can view and manipulate the objects or fields in a single GUI without regularly taking certain manual actions, such as paging or scrolling, for example. The GUI ensures that default and user-created data mappings and relationships are easy to read and understand, despite a large volume of data entities and attributes that can be accessed, mapped, and/or grouped.

FIG. 1 illustrates a hierarchical relationship 100 between the elements in data schemas, according to some embodiments. The following terms can be used to describe the elements in representative data schemas:

Attribute: a piece of information that determines the properties or content of a field, such as within an entity of a canonical schema;

Data source: a business organization, such as a department, subsidiary, or vendor, or generally a tenant, that manages a database of customer information; a specific database of customer information from a tenant;

Entity: a data record containing fields of related or similar attributes;

Field: a part of a data record, such as an attribute of a canonical entity or a section of data within a data source object, that serves as a placeholder for information;

Group: a plurality of entities in a connected relationship, such as those being located close together and/or classed together;

Instance-enabled: a state of a data record in which the content (e.g., attributes) of fields is static, for example, occurring when a data mapping is made to each field of a canonical entity having selected attributes, or a specific "type" of attributes; depending on the type selected, a different set of fields can be available for mapping; a way of setting up canonical entities in such a way as to allow multiple instances of an entity, where the fields on each individual instance can be allowed a single mapping;

Object: a data construct or record that provides a description of something that may be used by a computer in a CRM system, such as a category of customer data, specifically contact information or account information, for example; objects may contain several fields of subcategories of information;

Schema: a representation of data (e.g., structure and/or database organization), for example, in the form of a model; and Tenant: a business organization with a data center managed in a CRM system.

For example, in a data source schema 102, which can be acanonical, or specific to a tenant, data can reside from a specific data source (or tenant) 104. A category or class of data can be represented as an object 106. An object 106 can include one or more different field(s) 108 assigned to that object 106.

In another example, a data schema can be represented as a canonical data model 110. In the canonical, or standard construct, an entity group 112 can contain a plurality of connected data records, each data record being an entity 114. An entity 114 can have one or more attribute(s) 116 describing the entity 114. In an instance-enabled canonical data model, a user may define an instance of an attribute 118.

Figure 2:
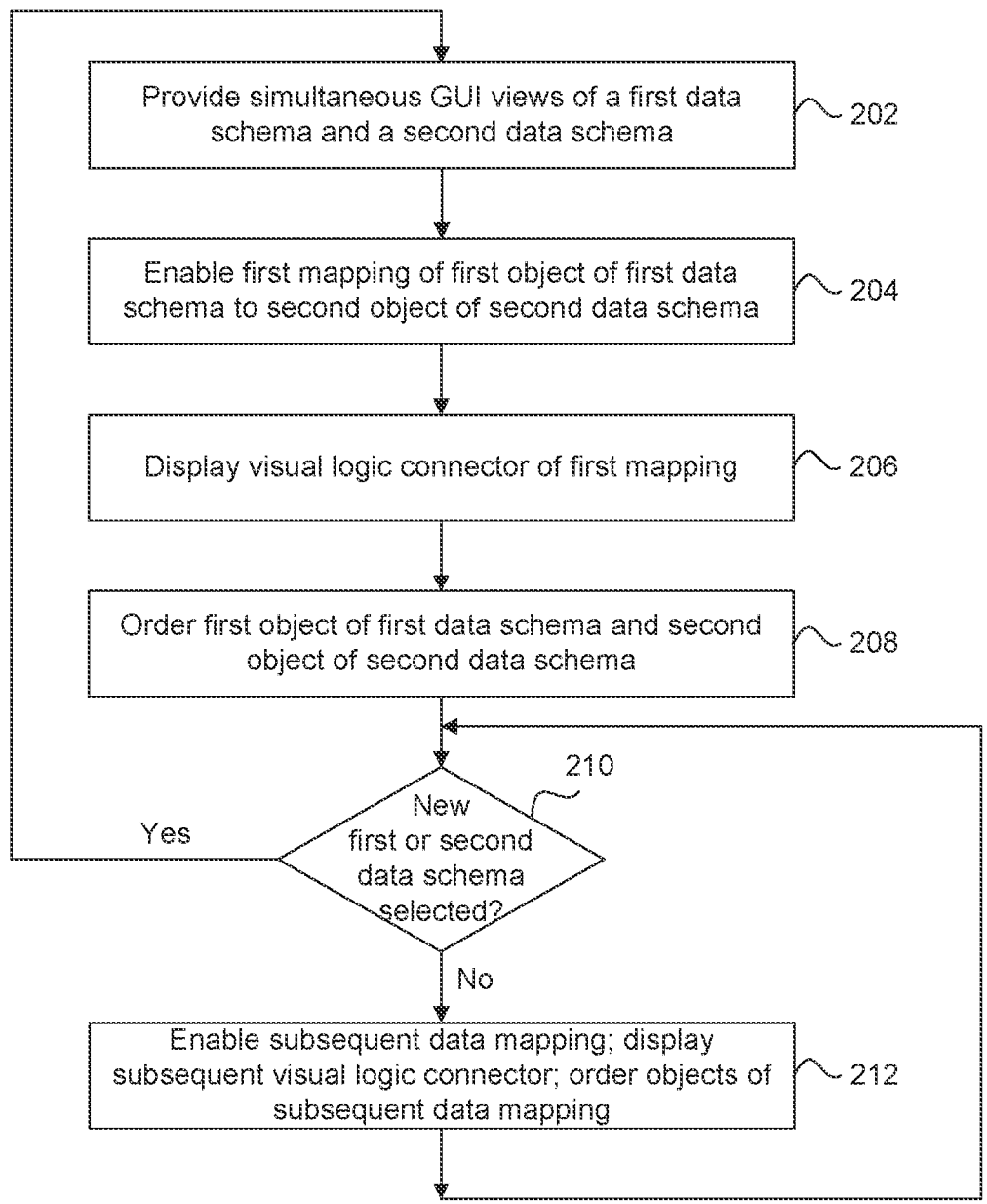
FIG. 2 illustrates a flow chart depicting the process steps of a method of data mapping, according to some embodiments.

FIG. 2 illustrates a flow chart 200 depicting the process steps of a method of data mapping, according to some embodiments. In step 202, the GUI can provide simultaneous, side-by-side views of a data schema (a first data schema on the left side of the GUI, for example) and another schema (a second data schema on the right side of the GUI, for example). Each of the schemas may be a canonical schema or an acanonical schema, for example.

In step 204, the GUI can enable a user to make a mapping of a first object from the first data schema to a second object of the second data schema, for example, by a drag-and-drop action, or by a point-and-click action to select each of the target objects of the mapping. The drag-and-drop action can be implemented, for example, by applying a hand cursor as the user hovers over a circle of a field, grabbing it by clicking and holding down a mouse button, dragging the mouse, and releasing the mouse at the circle of the field to which the mapping is to be made. The point-and-click action for selecting the fields of a mapping can be implemented, for example, by hovering a pointer over the circle of a field, selecting the circle with a click of the mouse, and selecting the second field to which to map with another click of the mouse. The description of FIG. 9B, later in this specification, illustrates the examples of the point-and-click action and the drag-and-drop action.

In step 206, the GUI can display an embodiment of a relationship connector, such as a visual logic connector, of the mapping, as illustrated in the GUI descriptions and associated figures of this specification.

In step 208, the GUI can order the first object within the first data schema and/or the second object within the second data schema to reduce the visual complexity of the visual logic connector created by the mapping. In step 210, if the user selects a new data schema, the process can repeat, starting again at step 202, with new views of the selected side-by-side schemas.

At step 212, with two data schemas selected and a mapping made, the user can create a subsequent data mapping between the first data schema and the second data schema, which can be subsequently displayed and visually relocated within the GUI when the respective objects are reordered within their respective data schemas.

Again, at step 210, if a new first or second data schema is selected after multiple mappings have been made, the process can start again at step 202, with new GUI views of the side-by-side schemas. Otherwise, the user can create subsequent data mappings according to step 212.

The details of the method steps will be further understood by a description of the data structures and user interface to the data structures, including specific data views, GUI pages, and actions available to the user through the Data Mapping GUI.

Data Objects and Groupings within Acanonical and Canonical Schemas

Acanonical and canonical schemas can have multiple objects with multiple fields and multiple relationships. An embodiment of a canonical data schema can contain thousands of entities and attributes, for example. With all of this information on a GUI screen, the user's view can become very cluttered and difficult to understand. Embodiments herein solve this by limiting what is shown in the Data Mapping GUI to just objects and fields that have been mapped from a given section of the canonical. These sections are called "entity groups." There can be several levels of these groups within the canonical to help the user make sense of the data structure within the canonical.

Figure 3:
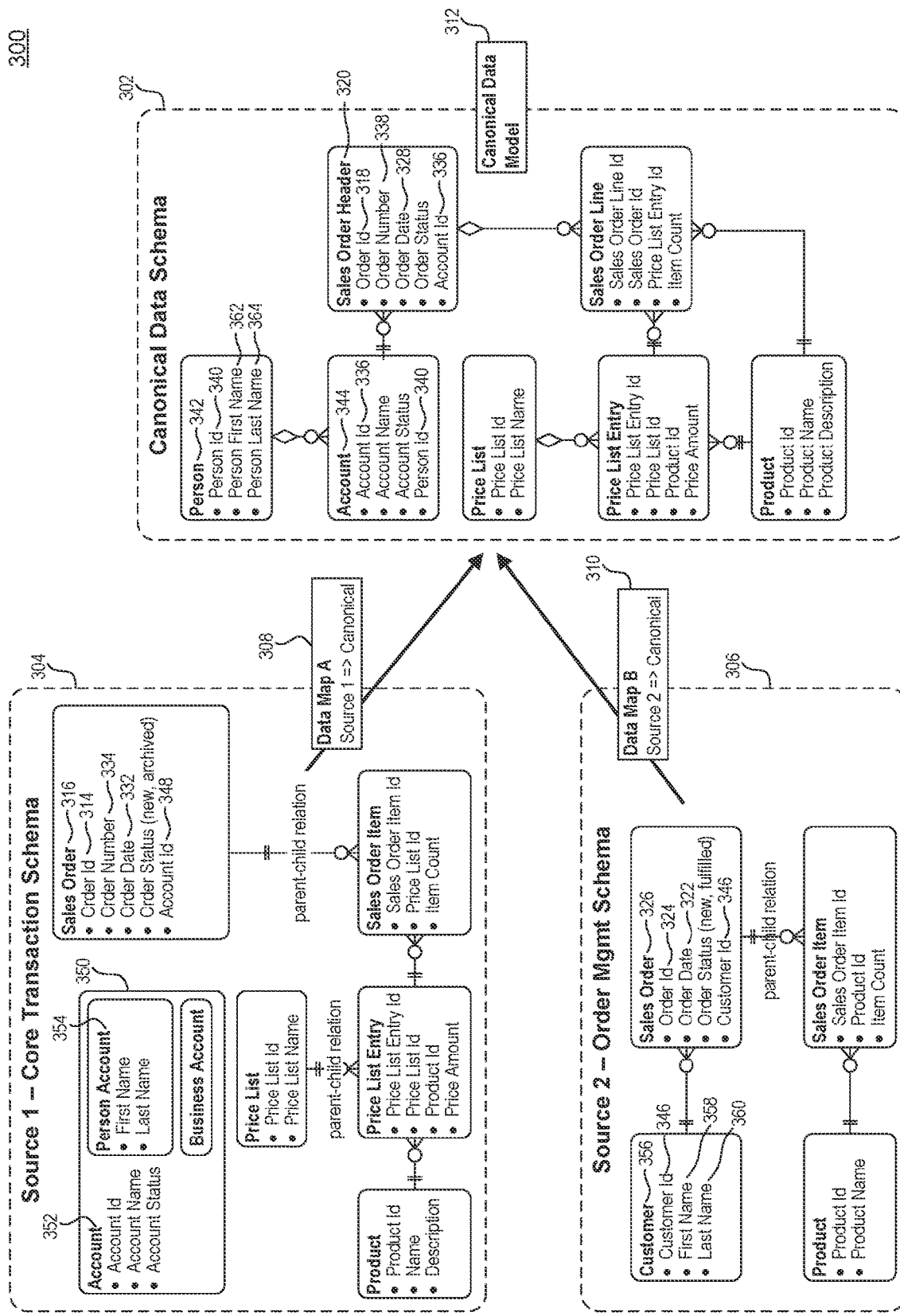
FIG. 3 illustrates examples of objects within data structures of acanonical data schemas (left) and entities within a canonical data schema (right), according to some embodiments.

FIG. 3 illustrates these levels of entity groups by showing examples 300 of objects within acanonical data schemas (left) alongside entities within a canonical data schema (right), according to an example embodiment. For example, FIG. 3 shows a resulting canonical data schema 302 from the mapping of the objects of a "Source 1—Core Transaction Schema" (Source 1 schema) 304 and a mapping of the objects of a "Source 2—Order Mgmt Schema" (Source 2 schema) 306. Data Map A 308 maps the data objects of the acanonical Source 1 schema 304 to the canonical data schema 302. Data Map B 310 maps the data objects of the acanonical Source 2 schema 306 to the canonical data schema 302. The canonical data schema 302 can serve as a canonical data model 312 for other data schemas, where the canonical includes a composite of the data structures, related and grouped under summarized entity group names.

For example, "Order Id" 314, grouped under "Sales Order" 316 in the Source 1 schema 304, is mapped to "Order Id" 318 under the group "Sales Order Header" 320 in the canonical data schema 302. Similarly, "Order Id" 324, grouped under "Sales Order" 326 in the Source 2 schema 306, is mapped as "Order Id" 318 under the group "Sales Order Header" 320 in the canonical data schema 302. "Order Date" 322, grouped under "Sales Order" 326 in the Source 2 schema 306, is mapped as "Order Date" 328 under the group "Sales Order Header" 320 in the canonical data schema 302. Similarly, "Order Date" 332, grouped under "Sales Order" 316 in the Source 1 schema 304, is mapped as "Order Date" 328 under the group "Sales Order Header" 320 in the canonical data schema 302. Here, the names of the data objects in the different acanonical data schemas are the same and clearly map to the canonical in the same way, on a one-to-one basis.

However, the names of the objects may not be the same between the acanonical source data schemas. A user can map objects to the canonical data schema that have the same or closely-related data content but may be of different object names in different source data schemas. A user can map an object name in an acanonical source data schema to a different entity or attribute name in the canonical data schema. For example, in the group "Sales Order" 326 of the Source 2 schema 306, the object "Customer Id" 346 can be mapped to "Person Id" 340 under either or both groupings "Person" 342 and/or "Account" 344 of the canonical data schema 302.

A user can assign an object to the canonical data schema as a new entity name within a canonical grouping, whether or not other acanonical data schemas will map to it. For example, object "Order Number" 334 in the Source 1 schema 304 does not have an equivalent object name in the Source 2 schema 306. Object "Order Number" 334 is mapped to the canonical data schema 302 as entity "Order Number" 338 under the "Sales Order Header" 320 grouping. The Source 2 schema 306 may have no equivalent mapping to that entity in the canonical data schema 302.

A user can map a single object from an acanonical source data schema to multiple entity groupings and entity attributes within the canonical data schema. For example, "Account Id" 348 under the "Sales Order" 316 group of the Source 1 schema 304 may map to both "Account Id" 336 attributes of the "Account" 344 and "Sales Order Header" 320 entity groupings of the canonical data schema 302.

A canonical data schema can be used to compartmentalize and/or sort data under standardized categories. For example, the Source 1 schema 304 groups "Account" 352 and "Person Account" 354 data under the same grouping 350, whereas the canonical data schema 302 groups this information into smaller, more specific entity groups "Person" 342 and "Account" 344.

A person of ordinary skill in the art will appreciate that there are any number of ways and reasons that a service department may group data for its own needs, and that the data that it groups may be useful to another department in another representation and/or organization of the data. The canonical data schema provides a standardized data structure that can be used by each service department for its unique purpose.

For example, an "Order Management" department, traditionally using the Source 2 schema 306, may be the only department using the entity group name "Customer" 356. Yet with a practical mapping of the Source 2 schema 306 to the canonical data schema 302, for example, "Customer" 356 fields "Customer Id" 346, "First Name" 358, and "Last Name" 360 can map to "Person" 342 fields "Person Id" 340, "Person First Name" 362, and "Person Last Name" 364, respectively, the Order Management department may efficiently use the canonical data schema 302 for its own purposes. The Order Management department may also share its data with other departments using the same canonical data schema 302.

Data Mapping to Entity Groups with Visual Logic Connectors

Having multiple relationships between multiple entities and objects presents the potential for a very complex GUI. This can be solved by grouping relationships where possible. The Data Mapping GUI can be populated to show all available canonical model attributes and entities. Rather than populate all attributes and entities, however, the data mapping process can be visibly simplified by allowing the user to select an acanonical data source and/or a canonical entity group to which to map, one at a time.

FIG. 4 illustrates the Data Mapping GUI 400 in an empty state, that is, at the start of the mapping data process, according to some embodiments. In the empty state, the user can select one data source from an acanonical data schema, or Data Source Schema 402, on the left side of the Data Mapping GUI 400 by clicking the menu drop-down "Select a Data Source" 404. The user can also select one canonical entity group from a canonical data schema, or Canonical Data Model 406, on the right side of the Data Mapping GUI 400 by clicking the menu drop-down "Select an Entity Group" 408.

Between the left and right sides of the Data Mapping GUI 400 is a column area that can show the "Number of Mappings" 410, as discussed below. The Data Mapping GUI 400 also has a search box 412, allowing a user to search for an entity, object, attribute, or field, also discussed below.

In FIG. 4, the drop-down menus for both the Data Source Schema 402 (the first drop-down menu 414) and the Canonical Data Model 406 (the second drop-down menu 416) are fully expanded for illustration purposes. However, in most embodiments, the drop-down menus will not expand until clicked on by a user so as to minimize the amount of extraneous data shown on the Data Mapping GUI 400 until the data is needed for display and selection.

In the example shown in FIG. 4, "NTO Service Desk New York" 418 was selected as the Data Source, and "Contact Point" 420 was selected as the Entity Group, as indicated by the checkmarks next to these objects. Once an item is selected, the respective drop-down menu will collapse and update with the name of the respective Data Source or Entity Group.

The GUI can enable the user to switch between different Data Sources at any time by clicking on the Data Source drop-down menu and selecting another Data Source. Similarly, the GUI can enable the user to switch between different Entity Groups at any time by clicking on the Entity Group drop-down menu and selecting another Entity Group.

In addition to the Data Source selection, the timestamp (date and time) when that Data Source was last edited (that is, mapped) can be displayed under the Data Source name.

Here, the NTO Service Desk New York was "Last Edited: Today at 10:34 AM" 422. The same type of timestamp can be shown for each object in the Entity Group. If the displayed object was never mapped, the timestamp can report that it was never mapped, as is the case for the timestamp of the "Contact Point" 420 Entity Group, which was "Last Edited: Never" 424, for example.

Each Data Source object in the Data Source Schema drop-down can have an associated icon, which is shown as either a heart 426 or a shopping bag 428, for example, in FIG. 4. The heart 426 icon and the shopping bag 428 icon represent examples of an indicator of the type of data source that a user has selected for mapping. The iconography may be more extensive and can be based on a multitude of data sources available for selection within the GUI. The data source may be based on various applications of the CRM system, where each application, and each data source, may have a different and/or unique purpose. For example, as illustrated, the heart 426 icon represents a service-related data source connected to a service cloud of the CRM system, and the shopping bag 428 icon represents a commerce-related data source connected to a commerce cloud of the CRM system.

After the loading of the Data Source Schema 402 and the Canonical Data Model 406 is completed, the Data Mapping GUI 400 can provide to the user the most collapsed view of the related canonical entities on the right side of the GUI and also the most collapsed view of the tenant objects on the left side of the GUI. A collapsed view, for example, may be visibly reduced in size such that a parent entity or a parent object, for example, is visible in the GUI along with a numeric indication of the existing child attributes or fields subordinate to the respective parent, but the child attributes or fields are hidden from the view of the user. When the respective parent entity or parent object is expanded, for example, the respective child attributes or fields will be displayed to the user.

Lastly, the GUI can perform, and display to the user, default mapping based on the selected Data Source Schema 402 and Canonical Data Model 406.

Figure 5:
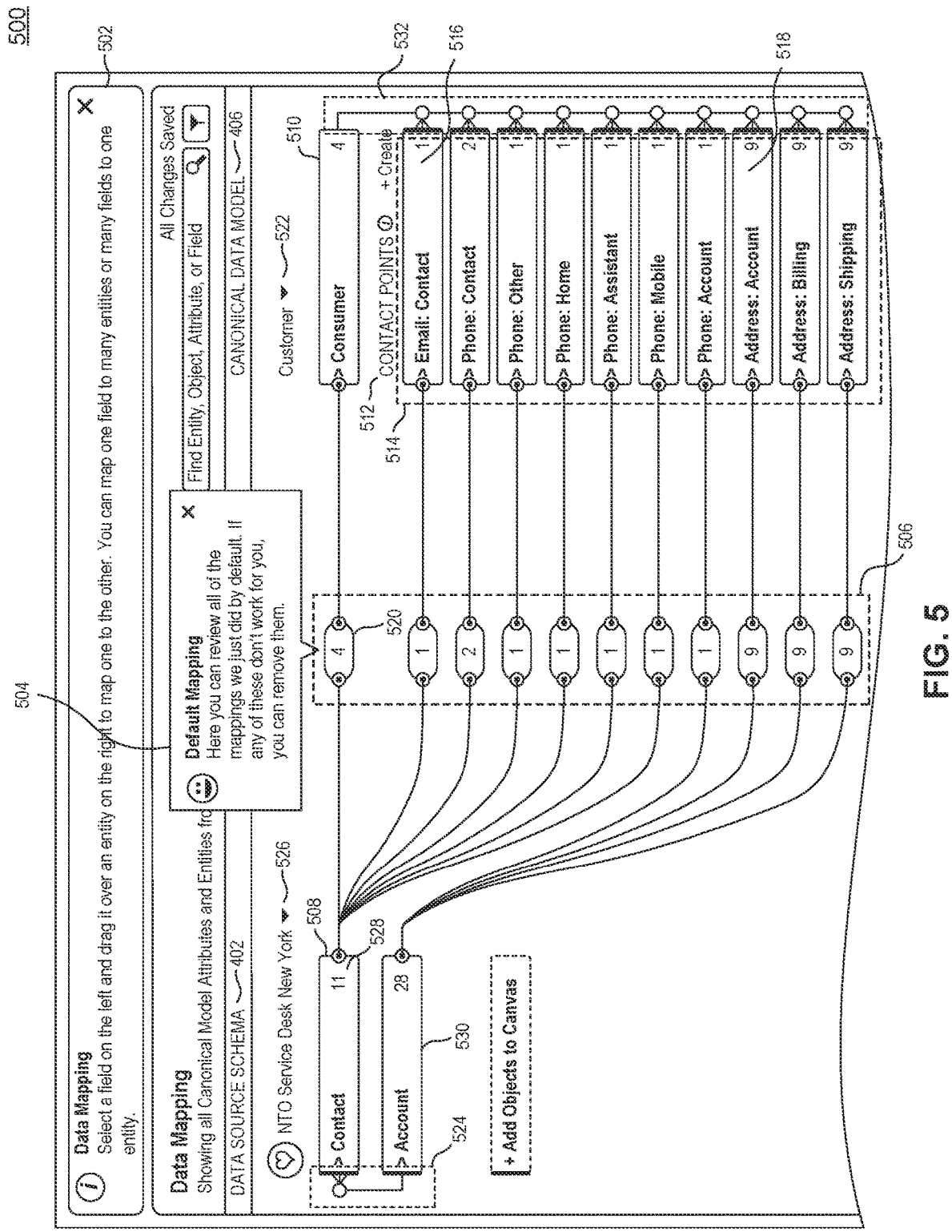
FIG. 5 illustrates a default state of the Data Mapping GUI, according to some embodiments.

FIG. 5 illustrates a default state 500 of the Data Mapping GUI, according to some embodiments. The default state 500 of the Data Mapping GUI can provide instructional text on what default mappings are displayed and what further actions can be taken by the user via an informational header 502 at the top of the GUI. The informational header 502 provides guidance to the user to perform data mapping actions. For example, as shown in the information header 502 of FIG. 5, the user is informed to "Select a field on the left and drag it over an entity on the right to map one to the other. You can map one field to many entities or many fields to one entity." Additionally, the GUI can provide a pop-up "tooltip" 504 for further information and instruction. For example, as shown in the tooltip 504, "Here you can review all of the mappings we just did by default. If any of these don't work for you, you can remove them." This tooltip functionality offers the user relevant data mapping guidance to instruct the user regarding the available functionality to facilitate the start of a user-friendly data mapping process.

In FIG. 5, several default mappings are shown. A plurality of pills 506 in the middle column of the GUI shows the number of existing data mappings from one or more objects of the Data Source Schema 402 to one or more entities, or a group of a plurality of entities, and their attributes of the Canonical Data Model 406. For example, an object "Contact" 508 of the Data Source Schema 402 is mapped to an entity "Consumer" 510 of an entity group "Customer" 522 of the Canonical Data Model 406. The object "Contact" 508 of the Data Source Schema 402 is also mapped to an entity "CONTACT POINTS" 512 with a plurality of attributes 514, including "Email: Contact" 516 and "Address: Account" 518, for example.

The Data Mapping GUI can provide useful information to the user regarding the number of data mappings made between the Data Source Schema 402 and the Canonical Data Model 406. For example, data mapping information can be provided inside the plurality of pills 506 and the object and entity representations, as well as between the object, pill, and entity representations in the form of lines connecting these representations. For example, the representation of the object "Contact" 508 of the Data Source Schema 402 indicates that 11 data mappings 528 have been made to the Canonical Data Model 406. By following the lines from the object "Contact" 508, the user can see relationship connectors between this object on the left side of the GUI and the entities on the right side of the GUI.

These relationship connectors, also called "visual logic connectors," can summarize the number, or quantity, of mappings from that object for the user. For example, the 11 data mappings 528, as connections out of the object "Contact" 508 of the Data Source Schema 402, go to 11 pills of the plurality of pills 506. Each of the plurality of pills 506 lists the number of data mappings made to entities in the Canonical Data Model 406. For example, the top pill 520 indicates 4 connections or mappings to the entity "Consumer" 510. These 4 connections represent the number, or quantity, of attributes within the entity "Consumer" 510 that are mapped. The entity "Consumer" 510 also displays the number 4 to indicate that there are 4 mapped attributes that can be seen under the entity "Consumer" 510 if the entity were expanded. In total, to make up the 11 data mappings 528, there are 4+1+2+1+1+1+1 (=11) connections (reading down from the top pill 520).

Display Scaling of Parent/Child Relationships

Regardless of whether an object or entity is expanded in the GUI, the GUI can show many-to-one relationships to inform the user about parent/child relationships of objects and entities. For example, the connectors of the parent/child relationships 524 indicate that, for many contacts within the selected data source "NTO Service Desk New York" 526 having "Contact" 508 data, each contact has account data under the object "Account" 530. Similarly, the connectors of the parent/child relationships 532 indicate that, for each entity "Consumer" 510 in the Canonical Data Model 406, there can be many "Email: Contact" 516 instances and many "Address: Account" 518 instances, for example.

Figure 6:
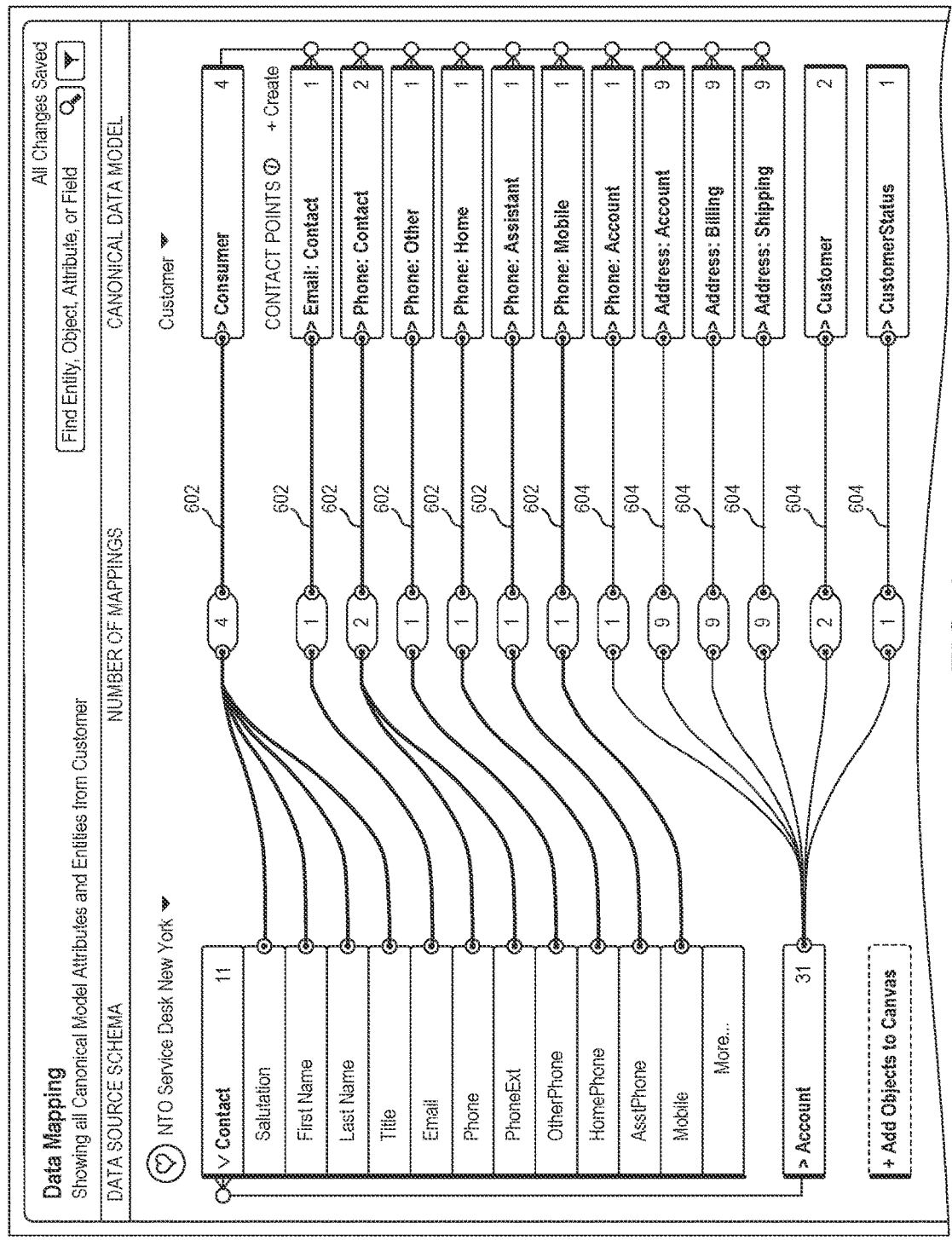
FIG. 6 illustrates a Data Mapping GUI screenshot demonstrating different highlighting of connection lines to expanded and collapsed groups, according to some embodiments.

Because there can be a large number of mappings, the user can expand each entity or object, which allows the user to see the mappings under the respective entity or object at the field level. As seen in the Data Mapping GUI screenshot 600 of FIG. 6, groups that are expanded can show a slightly darker connection line 602 than the connection line 604 of the collapsed groups. An expanded group reveals more details about the data within the schema, but expansion also takes up more GUI space, potentially cluttering the user workspace. Therefore, a user may work with objects and entities in collapsed views until the user wants to study, add, remove, or modify mappings within a specific object and/or entity.

Transformations

A transformation is a conversion of data from one format to another, for example, from the format of the data in an acanonical schema to a format of that data in a canonical data model. A transformation may be needed because the data formats of different schemas may vary. In a transformation, the contents of the data can be made compatible with the new data structure. A transformation rule can be associated with each data mapping.

Figure 7:
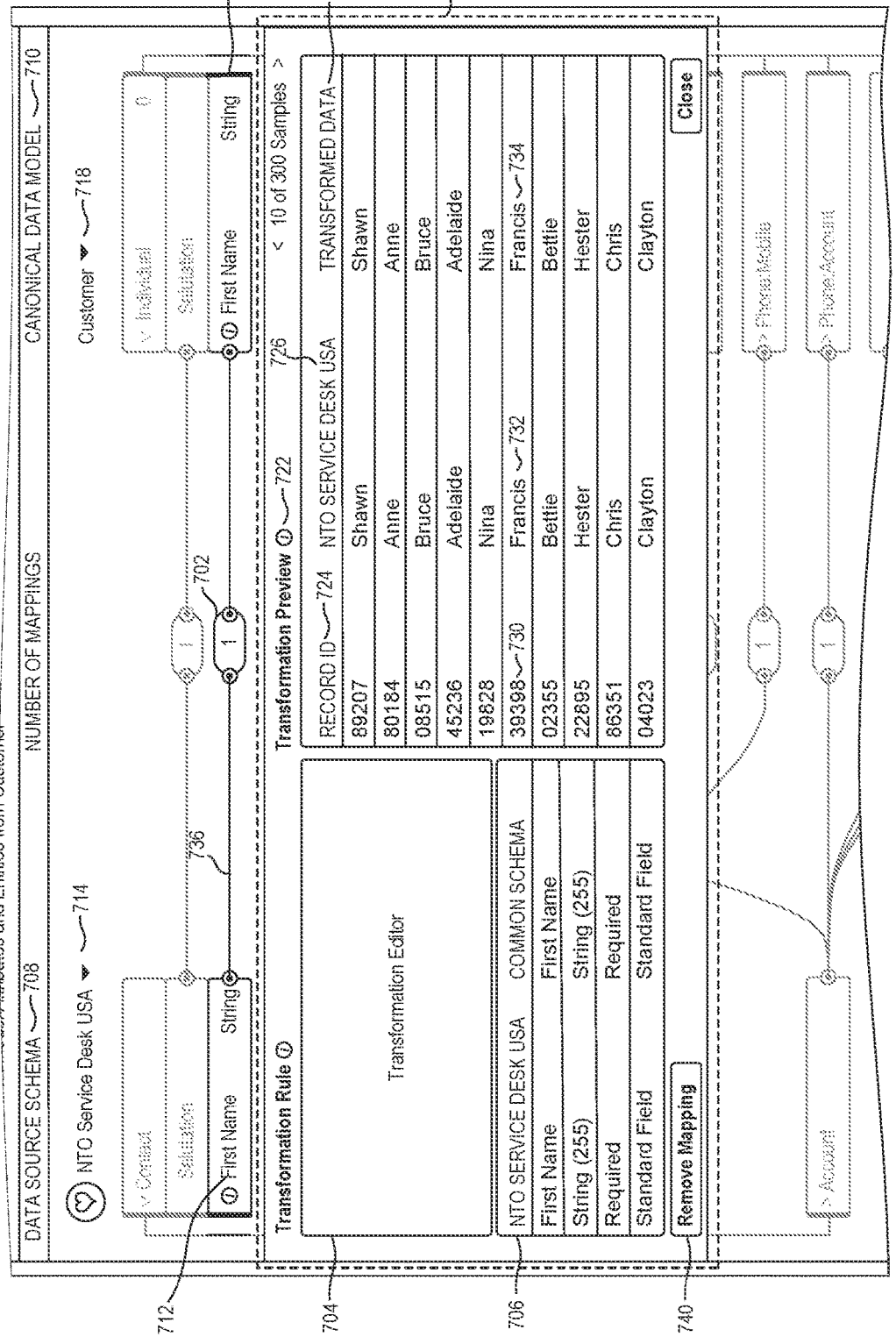
FIG. 7 illustrates a Data Mapping GUI screenshot showing a transformation rule editor, according to some embodiments.

FIG. 7 illustrates a Data Mapping GUI screenshot 700 showing a transformation rule editor 720, according to some embodiments. The transformation rule editor 720 is a GUI that enables the user to view the current transformation rule, data fields involved in the transformation, and the specific data transformed for the current data record. The transformation rule editor 720 can also enable the user to modify the transformation rule.

For example, when a user clicks on a pill, for example, pill 702, the GUI can open the transformation rule editor 720. The transformation rule editor 720 has a transformation editor 704, a display 706 of the current data transformations between a field of the Data Source Schema 708 on the left side of the Data Mapping GUI and the mapped field of the Canonical Data Model 710 on the right side of the Data Mapping GUI, and a transformation preview window 722 with a sample of the data transformed.

For example, for pill 702, the Data Mapping GUI 700 illustrates that the field "First Name" 712 of the data source schema "NTO Service Desk USA" 714 maps on a one-to-one basis with the field "First Name" 716 of the entity group "Customer" 718 of the Canonical Data Model 710. The pill 702 accordingly indicates a mapping of "1." By clicking on pill 702, the user can open the transformation rule editor 720. Simultaneously, the fields on both ends of the mapping, specifically "First Name" 712 and "First Name" 716, as well as the connecting line 736, highlight. The other fields in the GUI that are not part of the mapping to pill 702 dim.

The transformation rule editor 720 reveals how the data contents in the data source schema "NTO Service Desk USA" 714 map to the data contents in the field "First Name" 716 of the entity group "Customer" 718 of the Canonical Data Model 710. The transformation preview window 722 has specific columns of the current data record, including Record ID column 724, a "NTO Service Desk USA" column 726 showing the first name of each record ID, and a Transformed Data column 728 showing the first name of each record ID as appearing in the Canonical Data Model 710. For example, record 39398 730, containing the first name "Francis" 732 in the "NTO Service Desk USA" column 726, representing the data in that respective part of the data source schema 708, maps to the first name "Francis" 734 in the Transformed Data column 728, representing the data in that respective part of the Canonical Data Model 710.

Figure 8:
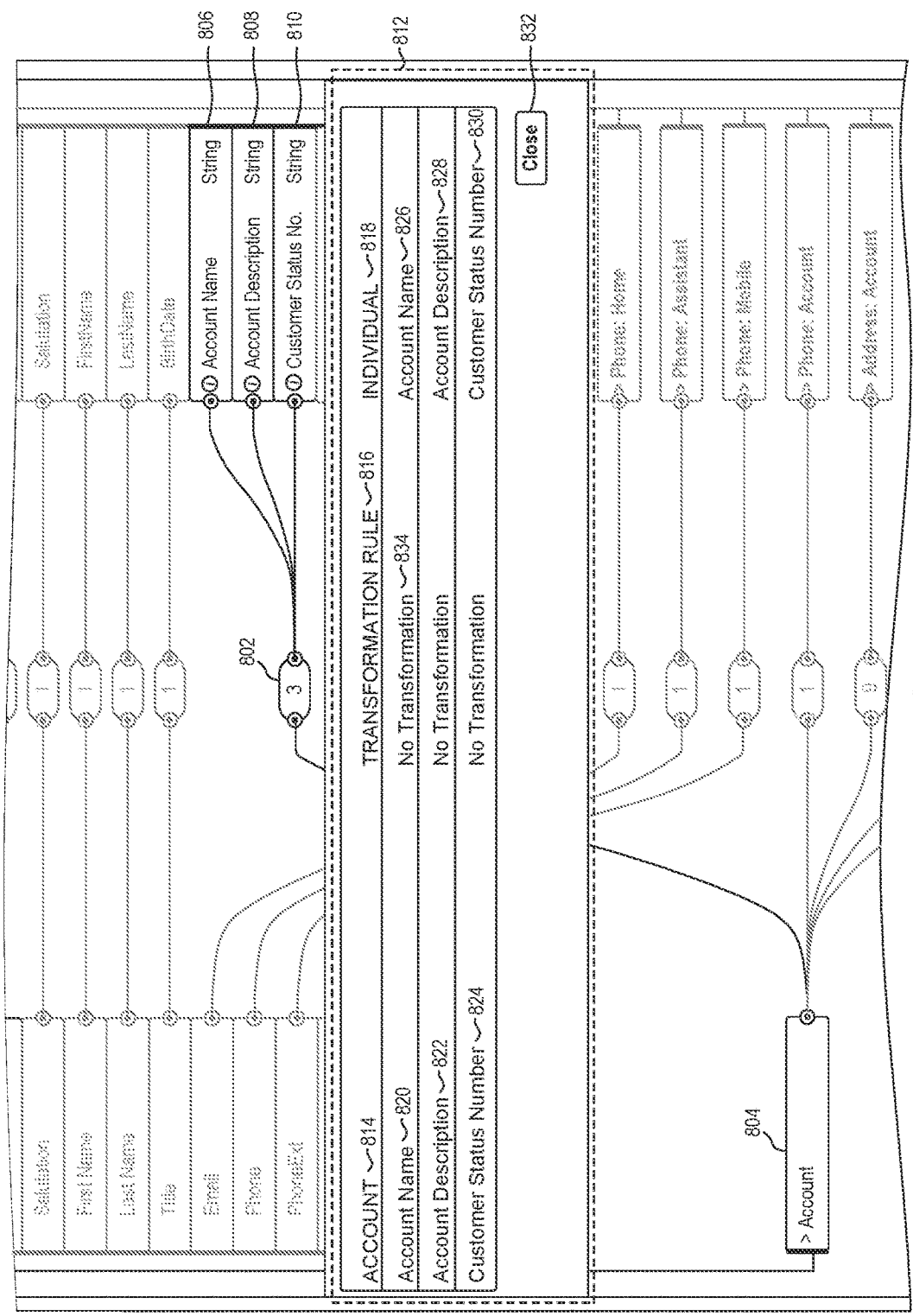
FIG. 8 illustrates a Data Mapping GUI screenshot showing a list of mappings and associated transformation rules for a pill indicating greater than one (1) mapping, according to some embodiments.

FIG. 8 illustrates a Data Mapping GUI screenshot 800 showing a list 812 of mappings and associated transformation rules for a pill indicating greater than one (1) mapping, according to some embodiments. In these embodiments, clicking on a pill with greater than a "1" in it will reveal a list of all the mappings within that group. The objects/entities will be highlighted and the non-related fields will be dimmed.

For example, in FIG. 8, the pill 802 indicates three (3) mappings from the data source object "Account" 804 to the canonical entities "Account Name" 806, "Account Description" 808, and "Customer Status Number" 810. By clicking on pill 802, the list 812 of mappings and transformations, including the columns "ACCOUNT" 814, "TRANSFORMATION RULE" 816, and "INDIVIDUAL" 818 appears. The data source object "Account" 804 is highlighted, as is the connecting line to the pill 802, as are the canonical entities "Account Name" 806, "Account Description" 808, and "Customer Status Number" 810.

Here, "ACCOUNT" 814 refers to the data source object "Account" from the left side of the GUI and its fields "Account Name" 820, "Account Description" 822, and "Customer Status Number" 824. The "TRANSFORMATION RULE" 816 column indicates what transformation rules apply to each of these respective fields. In this case, no transformation rules are applied. Therefore, the column "INDIVIDUAL" 818 includes the same fields "Account Name" 826, "Account Description" 828, and "Customer Status Number" 830.

The contents of the column "TRANSFORMATION RULE" 816 can be hyperlinks. For example, the words "No Transformation" 834, when clicked on, can open a transformation rule editor, as described for FIG. 7. Clicking on a transformation rule hyperlink will expand the two groups of the respective mapping, highlight that single mapping, and show the transformation view, as was discussed for FIG. 7. When the user is done using the list 812 of mappings and associated transformation rules, the user can click the "Close" button 832.

Creating a Mapping

Figure 9A:
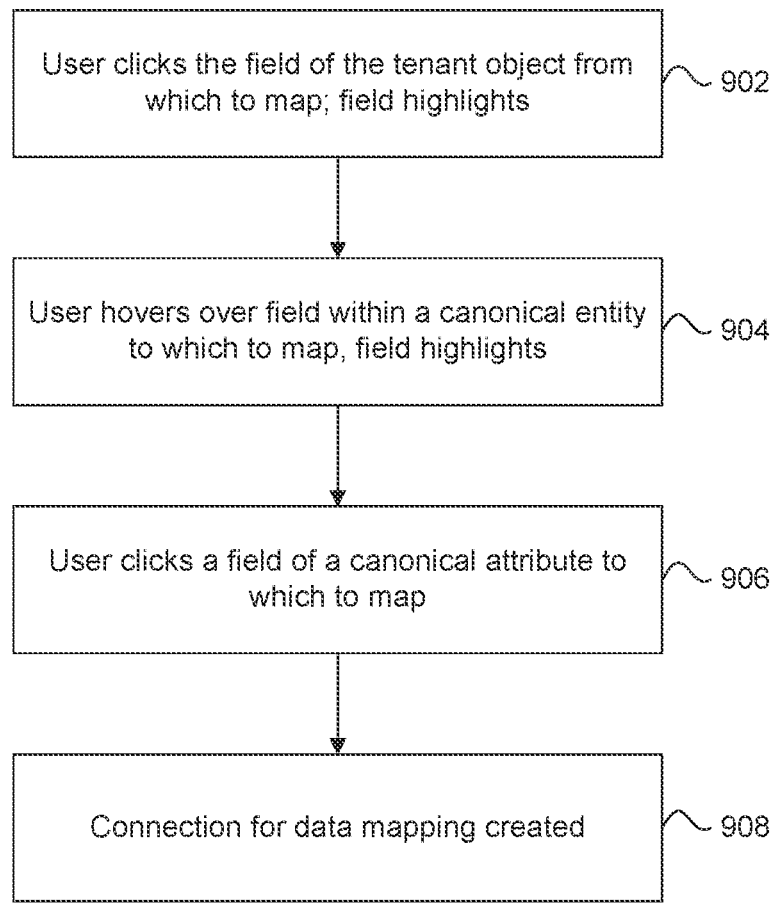
FIG. 9A illustrates a flowchart of a method for creating a data mapping, according to some embodiments.
Figure 9B:
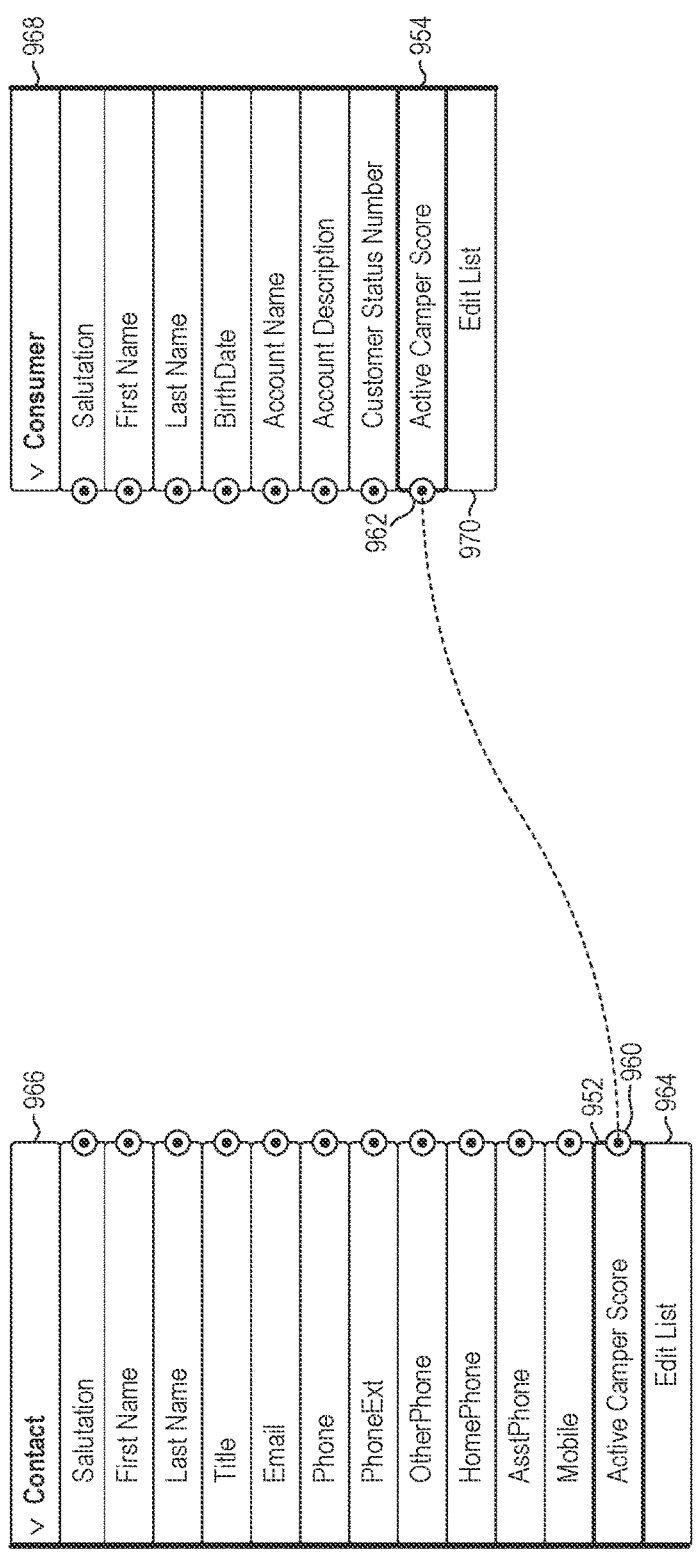
FIG. 9B illustrates a preview of a data mapping created from the method of FIG. 9A, according to some embodiments.

FIG. 9A illustrates a flowchart 900 of a method for creating a data mapping, according to some embodiments. FIG. 9A is described in relation to FIGS. 9B and 9C. FIG. 9B illustrates parts of a Data Mapping GUI screenshot 950 used for this method and showing a preview of the creation of a data mapping, according to these embodiments.

In FIG. 9A, step 902, the user can point to and click the field of the tenant object from which the user desires to map. In FIG. 9B, when the user clicks the tenant object field "Active Camper Score" 952 of the object "Contact" 966, the field highlights.

In FIG. 9A, step 904, the user can hover (for example, using a mouse cursor as a pointer) over a field of the canonical entity to which the user desires to map. In FIG. 9B, when the user hovers over the canonical attribute field "Active Camper Score" 954 of the entity "Consumer" 968, the field highlights. This allows the user to make the selection of the target field by pointing at it.

In FIG. 9A, step 906, the user can similarly point to and click the canonical attribute to which the user desires to map. In FIG. 9B, once the user clicks the canonical attribute field "Active Camper Score" 954, the connection for the data mapping is created. Both fields and the connection line can remain highlighted for some time, for example, for approximately half a second, as a visual confirmation of the most recently completed mapping.

Alternatively, the user may use the circles 960, 962 to create the mapping by a drag-and-drop action. That is, the user can apply a hand cursor as the user first hovers over the circle 960 of the field "Active Camper Score" 952, grab the circle by clicking and holding down a mouse button, drag the mouse over to the canonical data schema and specifically to the circle 962 of the field "Active Camper Score" 954, and release the mouse on the circle 962 to create the mapping.

In some embodiments, when a circle is grabbed, it can highlight. As the cursor is dragged out from the circle by the user, a second highlighted circle can be pulled out as a shadow or twin of the original circle, called a "drag circle." In the embodiments, the drag circle and the original circle are connected by a highlighted straight line between the two, which can be further pulled to reach a possible field of the canonical data schema to which to map, for example. Once the drag circle is over the possible field, the possible field and circle of the field can highlight.

When the user releases the drag circle on a field of the canonical data schema, known as a "drop," both fields of the mapping, the circles, and the connection line between the circles can highlight. These mapping elements can remain highlighted for some time, for example, for approximately half a second, as a visual confirmation of the most recently completed mapping.

Figure 9C:
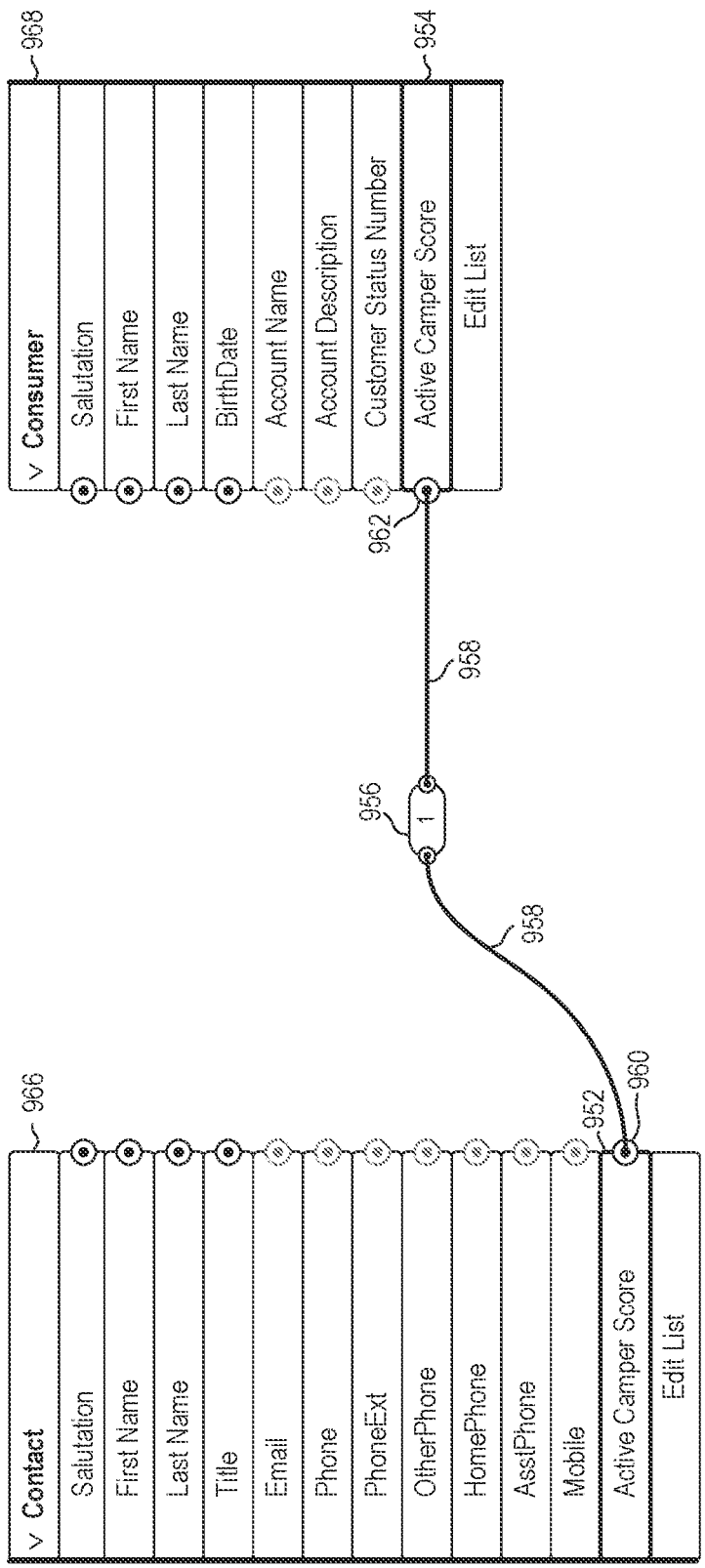
FIG. 9C illustrates the result of performing the steps of the method to create a data mapping, according to some embodiments.

The data mapping can then be created, according to step 908 of FIG. 9A. FIG. 9C illustrates the result of performing the steps of the method to create a data mapping, according to some embodiments. As illustrated in FIG. 9C, when the data mapping is completed, a pill 956 and solid connection line 958 between the fields "Active Camper Score" 952, 954 appear. In addition to the visual mapping in the GUI, dropping can create a transformation between the fields. Additionally, order logic can activate a dynamic reordering method, as discussed below.

Mapping Editing Using the Transformation Editor

In reference to FIG. 7, the Data Mapping GUI, via the transformation rule editor 720, can provide an interface to delete a mapping, using the "Remove Mapping" button 740. Upon clicking the "Remove Mapping" button 740, the GUI can provide a pop-up warning (not shown) to alert the user, for example, that "Removing this field might cause problems with events that rely on this field. Please ensure that this field is not used in any event before removing." An event may be a lookup of a field within a database and action on that field by a user of a schema, for example. If a field is inadvertently removed from a mapping, the user's desired action on that field may not be possible because the mapping would no longer exist to point to the desired data within the field, for example.

Dynamic Reordering of Source Objects Using Order Logic

Figure 10A:
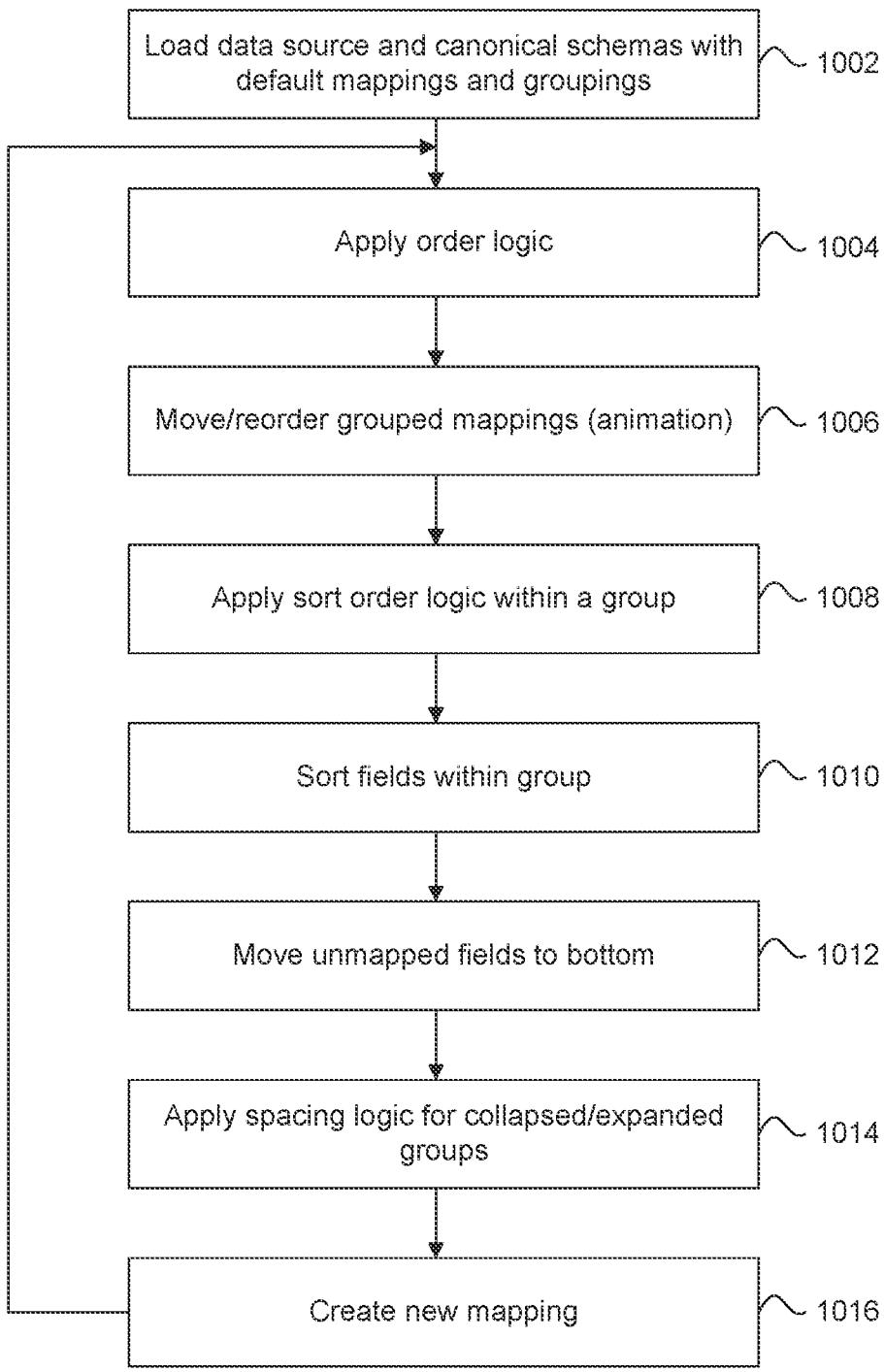
FIG. 10A illustrates a flowchart of a method for dynamic reordering of data maps within a Data Mapping GUI, according to some embodiments.

FIG. 10A illustrates a flowchart 1000 of a method for dynamic reordering of data maps within a Data Mapping GUI, according to some embodiments. The method is described in conjunction with example GUI embodiments of FIGS. 10B, 10C, 10D, and 10E.

In step 1002 of FIG. 10A, the method begins with two loaded schemas, one on each of the left and right sides of the Data Mapping GUI, such as a data source schema and canonical data model, for example. As previously disclosed, default mappings are presented to the user in the Data Mapping GUI once the loading is completed. Default mappings can include one-to-one, one-to-many, or many-to-one data mappings. Default mappings can also be pre-grouped. Within groups, default mappings can be pre-sorted (pre-ordered) such that fields are in alphabetical order.

Figure 10B:
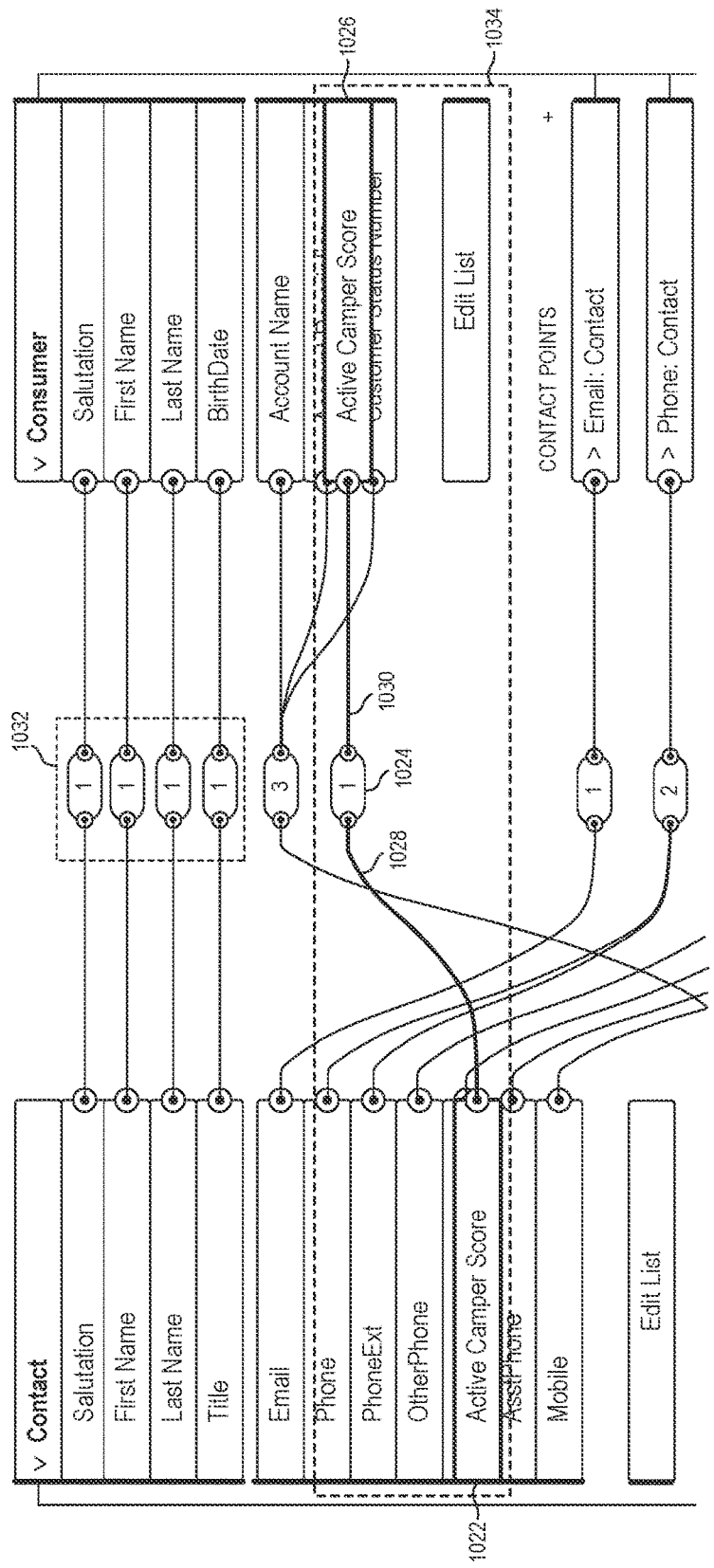
FIG. 10B illustrates a Data Mapping GUI screenshot of a new one-to-one data mapping among existing data maps, according to some embodiments.

FIG. 10B illustrates a Data Mapping GUI screenshot 1020 of a new one-to-one data mapping 1034 among existing data maps, according to some embodiments. When a new mapping is created, the field order can be reevaluated by the Data Mapping GUI. For example, the Data Mapping GUI can determine that mapping group 1032 is the group that the new data mapping 1034 should belong to.

Initially, in these and other embodiments, order logic can arrange (reorder) a newly created mapping by moving and placing a newly mapped field, from either or both the right or left side(s) of the GUI, in whatever position results in the most straight lines within the Data Mapping GUI view. This process reduces the complexity of the view of the data mappings for the user, for example, by increasing the quantity of straight lines of the mappings already made. In step 1004 of FIG. 10A, the order logic is applied, and in step 1006, the Data Mapping GUI can use animation to move and reorder the data mappings.

For example, the new data mapping, including a data source field "Active Camper Score" 1022, a pill 1024, and a canonical field "Active Camper Score" 1026, has a curved line 1028 between the data source field "Active Camper Score" 1022 and the pill 1024, based on the original locations of the fields. But, the data mapping has a straight line 1030 between the pill 1024 and the canonical field "Active Camper Score" 1026, also based on the original locations of the fields.

Figure 10C:
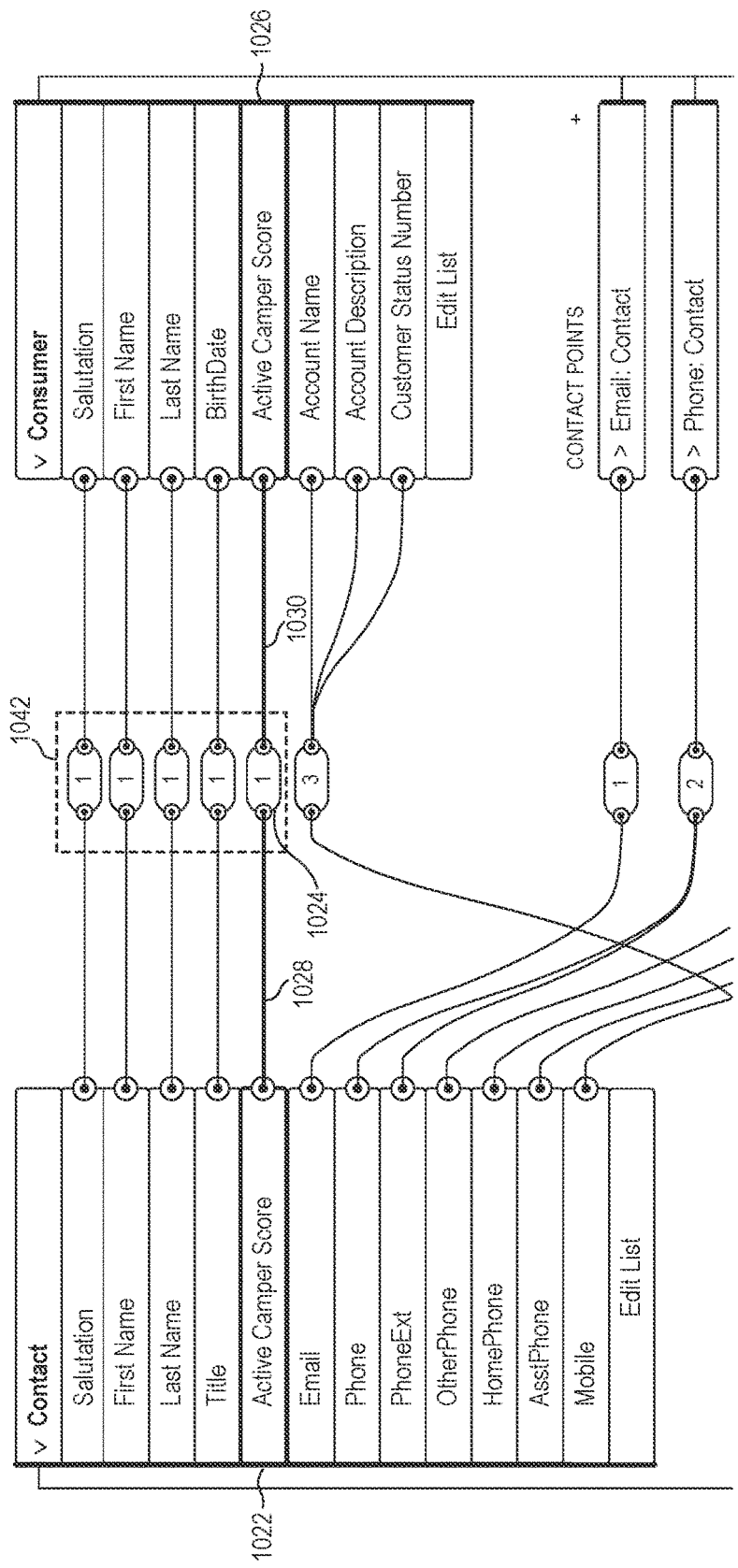
FIG. 10C illustrates a Data Mapping GUI screenshot with a reordered data mapping among existing data maps, according to some embodiments.

FIG. 10C illustrates a Data Mapping GUI screenshot 1040 with the reordered data mapping among existing data maps to create a new mapping group 1042, according to some embodiments. FIG. 10C shows the resulting data mapping when the reordering method automatically moves the fields within the Data Mapping GUI once the data mapping is created. In the reordered data mapping, the data source field "Active Camper Score" 1022 is connected to the pill 1024 by a now-straight line 1028. The pill 1024 is still connected with the straight line 1030 to the canonical field "Active Camper Score" 1026. The resulting data mapping is less visually complex.

As new data mappings are added, a goal of the method of ordering the data mappings, whether the mappings are single mappings or in groupings, is to achieve the least amount of overlap of connection lines and the most straight connection lines between mapped fields in the Data Mapping GUI, that is, a reduction of visual complexity. Additionally, the Data Mapping GUI maintains a sort order, after the reduction of visual complexity, to keep the resulting order of data mappings in each group within alphabetical order by field.

Thus, in step 1008 of FIG. 10A, some embodiments of the method apply sort order logic to the data mappings within groupings. In step 1010, the method sorts the fields within a group according to the sort order logic. In step 1012, the method moves unmapped fields within a group to the bottom of the list of fields in the group.

In step 1014 of FIG. 10A, spacing logic (discussed in the next section) is applied for grouped mappings as the user collapses and/or expands groups within the Data Mapping GUI. The collapsing and expanding can happen at any time as a user is working with the data mappings, but most embodiments will not allow an expand or collapse action while the Data Mapping GUI is applying order and sort logic. The Data Mapping GUI can refresh to provide the user a new GUI view of the result of the ordering and/or sorting before the user may perform another action.

In step 1016 of FIG. 10A, when a new data mapping is created, the method starts over at step 1004 with the order logic applied, field ordering within a group (step 1006), sort order logic applied (step 1008), and field sorting within a group (step 1010). Throughout the method, unmapped fields can be maintained at the bottom of a respective group (step 1012). At any time after a GUI refresh, if the user chooses to unmap a field using the "Remove Map" button 740 of FIG. 7, that field will subsequently get moved to the bottom of the respective group.

A more complex situation may result when fields are mapped one-to-many (that is, one data source object to many canonical entities or attributes, for example) or many-to-one (that is, many data source objects to one canonical entity or attribute, for example). In such a case, connection lines of one or more new data mappings may cross the connection lines of other data mappings, complicating the user's view of the data mappings within the Data Mapping GUI. To mitigate this, the reordering step 1006 can include adjusting the order of the relevant fields to remove the overlap and reduce the complexity of the connection lines.

Figure 10D:
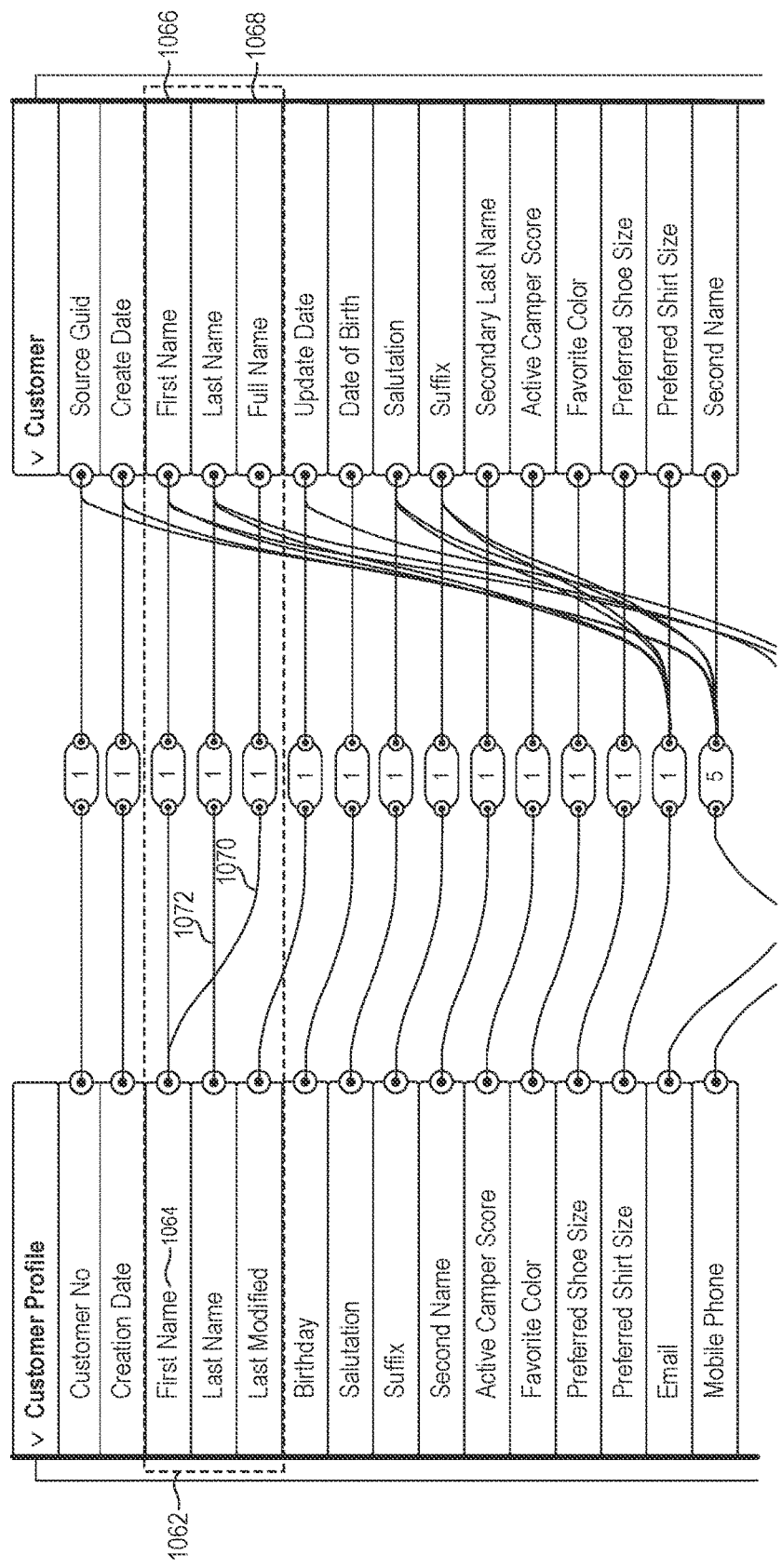
FIG. 10D illustrates a Data Mapping GUI screenshot with a new one-to-many data mapping, according to some embodiments.

For example, FIG. 10D illustrates a Data Mapping GUI screenshot 1060 with a new one-to-many data mapping 1062, according to some embodiments. In FIG. 10D, the data source object "First Name" 1064 is mapped to both the attributes "First Name" 1066 and "Full Name" 1068 of the canonical data schema. The "First Name" connection line 1070 overlaps the "Last Name" connection line 1072, complicating the view of those data mappings for the user. But, the method can apply order logic to prevent the overlap of the respective data mappings, as illustrated in FIG. 10E.

Figure 10E:
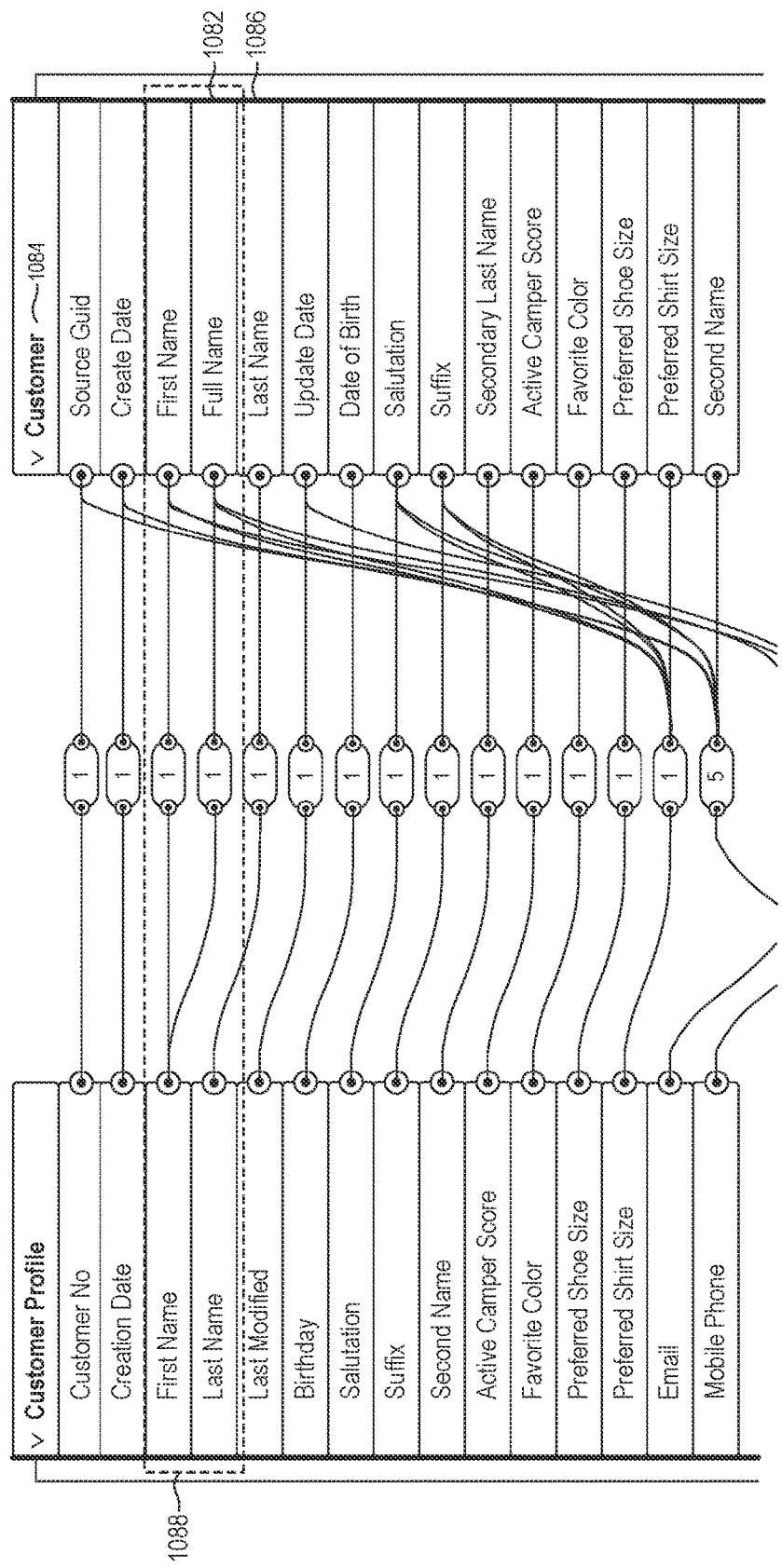
FIG. 10E illustrates a Data Mapping GUI screenshot with a reordered one-to-many data mapping, according to some embodiments.

In the example of FIG. 10E, the entity "Full Name" 1082 of the canonical data schema is moved up one field within the field order of the entity group "Customer" 1084. Also, the entity "Last Name" 1086 of the canonical data schema is moved down one field, essentially changing places with "Full Name" 1082. The movement of these fields removes the previous overlap shown in the ordering of data mappings 1062 to achieve the ordering of data mappings 1088.

In some embodiments, group ordering can be done in addition to field ordering within groups. Group order depends on the group that has the most number of straight lines from one field to another within the group. The group with the most straight lines can be placed at the top of the Data Mapping GUI view. If additional fields are added to a schema, the group order can remain the same while the field order can change. Upon reloading the GUI page, the group order can be updated to reflect the group order logic.

User Scaling and Group Spacing

Further to the description of step 1014 of FIG. 10A, a user can expand and/or collapse groups to reveal the fields within a group. Such an action by the user can cause what is shown on the Data Mapping GUI view to adjust, or scale. For example, a large group of data mappings, when expanded, can take up most or all of a GUI view, or a group may overflow the GUI view and require the user to scroll to see the entire group of data mappings. The Data Mapping GUI can dynamically adjust to these user actions to reduce the complexity of the data mapping display within the GUI.

Figure 11A:
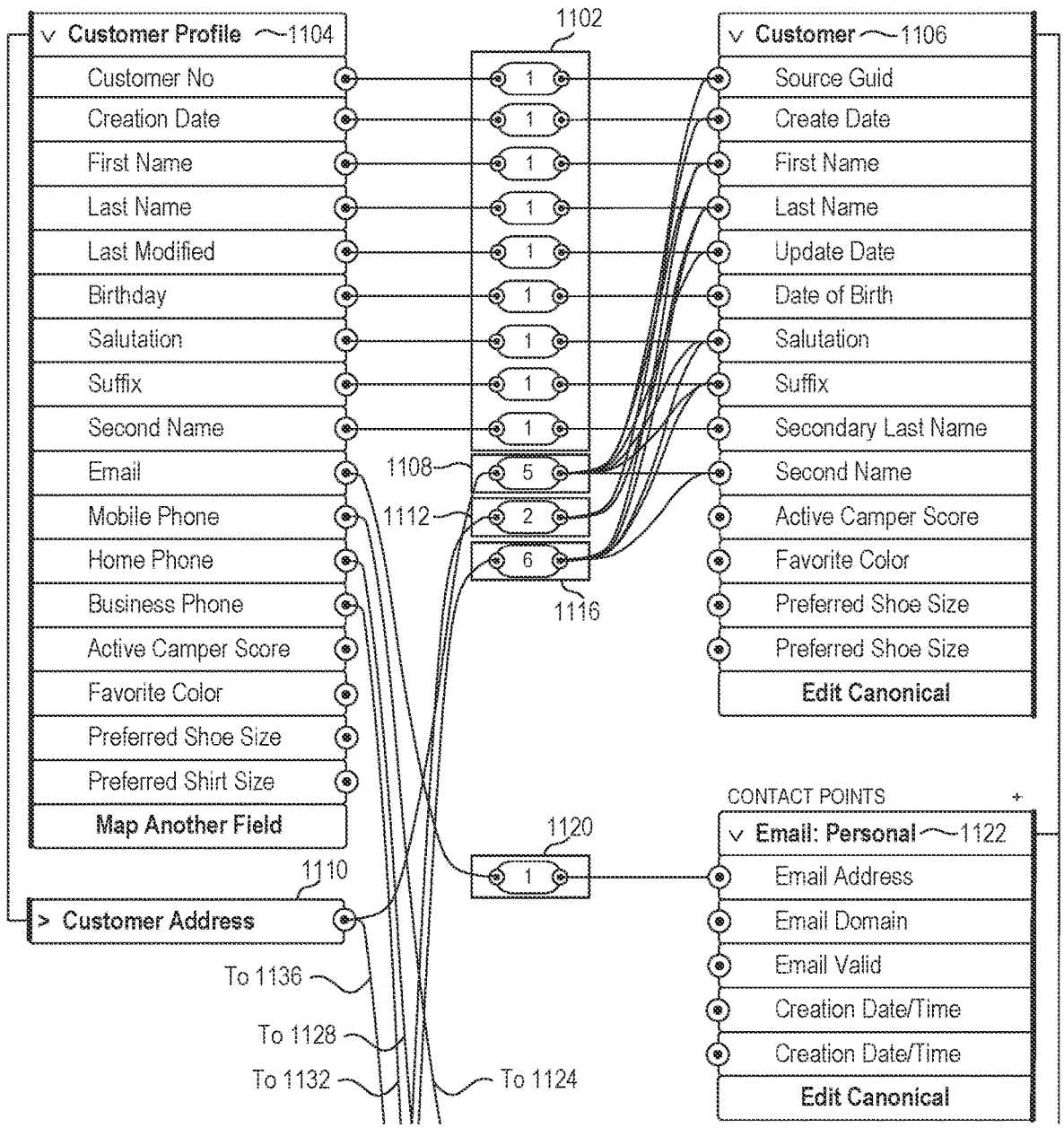
FIGS. 11A and 11B illustrate a Data Mapping GUI screenshot showing various examples of expanded and collapsed groups of data mappings, according to some embodiments.
Figure 11B:
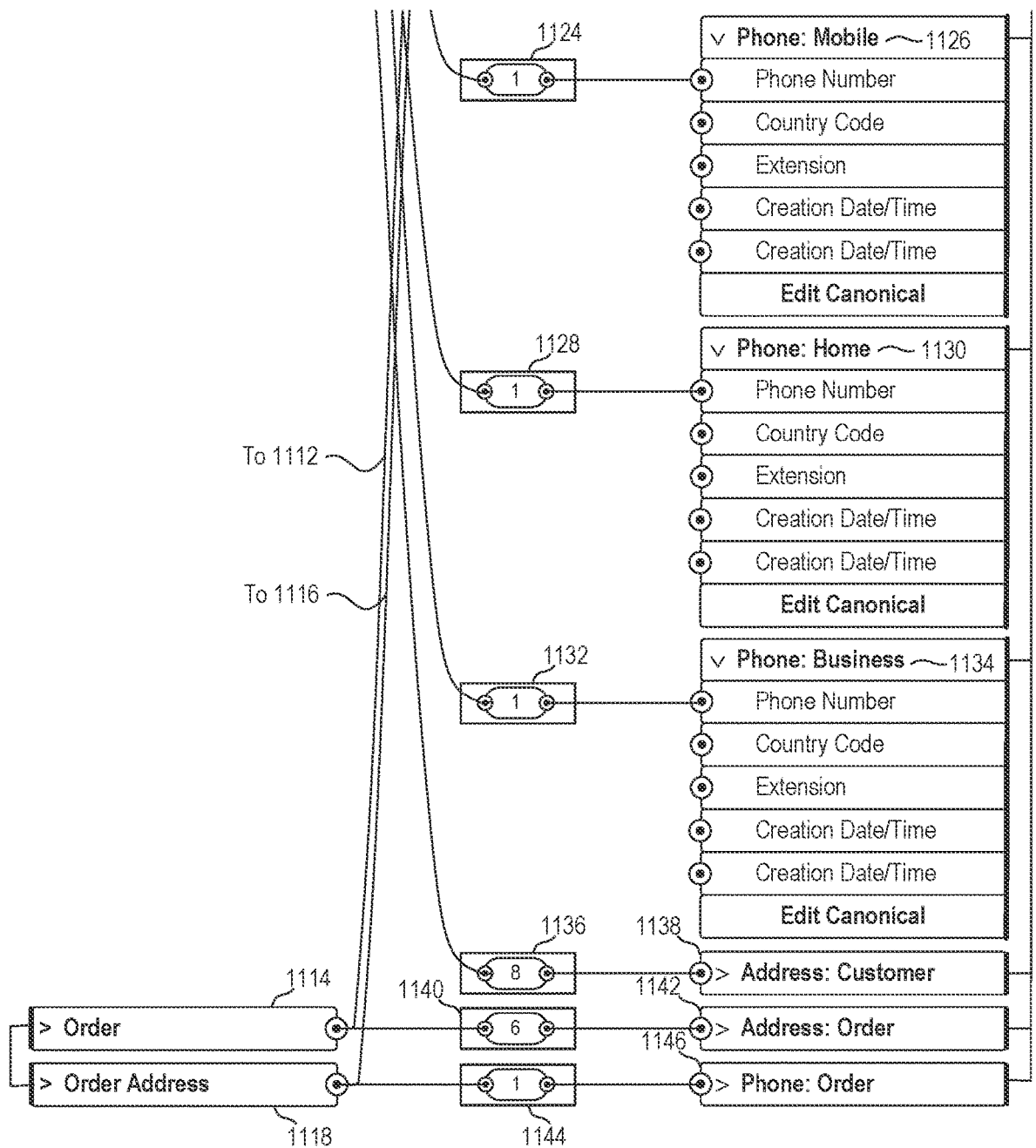

FIGS. 11A and 11B together illustrate a Data Mapping GUI screenshot 1100 showing various examples of expanded and collapsed groups of data mappings, according to some embodiments. A first group 1102 shows an expanded group of mappings from "Customer Profile" 1104 to "Customer" 1106. A second group 1108 shows a collapsed group of mappings from "Customer Address" 1110 to "Customer" 1106. A third group 1112 shows a collapsed group of mappings from "Order" 1114 to "Customer" 1106. A fourth group 1116 shows a collapsed group of mappings from "Order Address" 1118 to "Customer" 1106. A fifth group 1120 shows an expanded group of mappings from "Customer Profile" 1104 to "Email: Personal" 1122.

A sixth group 1124 shows an expanded group of mappings from "Customer Profile" 1104 to "Phone: Mobile" 1126. A seventh group 1128 shows an expanded group of mappings from "Customer Profile" 1104 to "Phone: Home" 1130. An eighth group 1132 shows an expanded group of mappings from "Customer Profile" 1104 to "Phone: Business" 1134. A ninth group 1136 shows a collapsed group of mappings from "Customer Address" 1110 to "Address: Customer" 1138. A tenth group 1140 shows a collapsed group of mappings from "Order" 1114 to "Address: Order" 1142. An eleventh group 1144 shows a collapsed group of mappings from "Order Address" 1118 to "Phone: Order" 1146.

Figure 12:
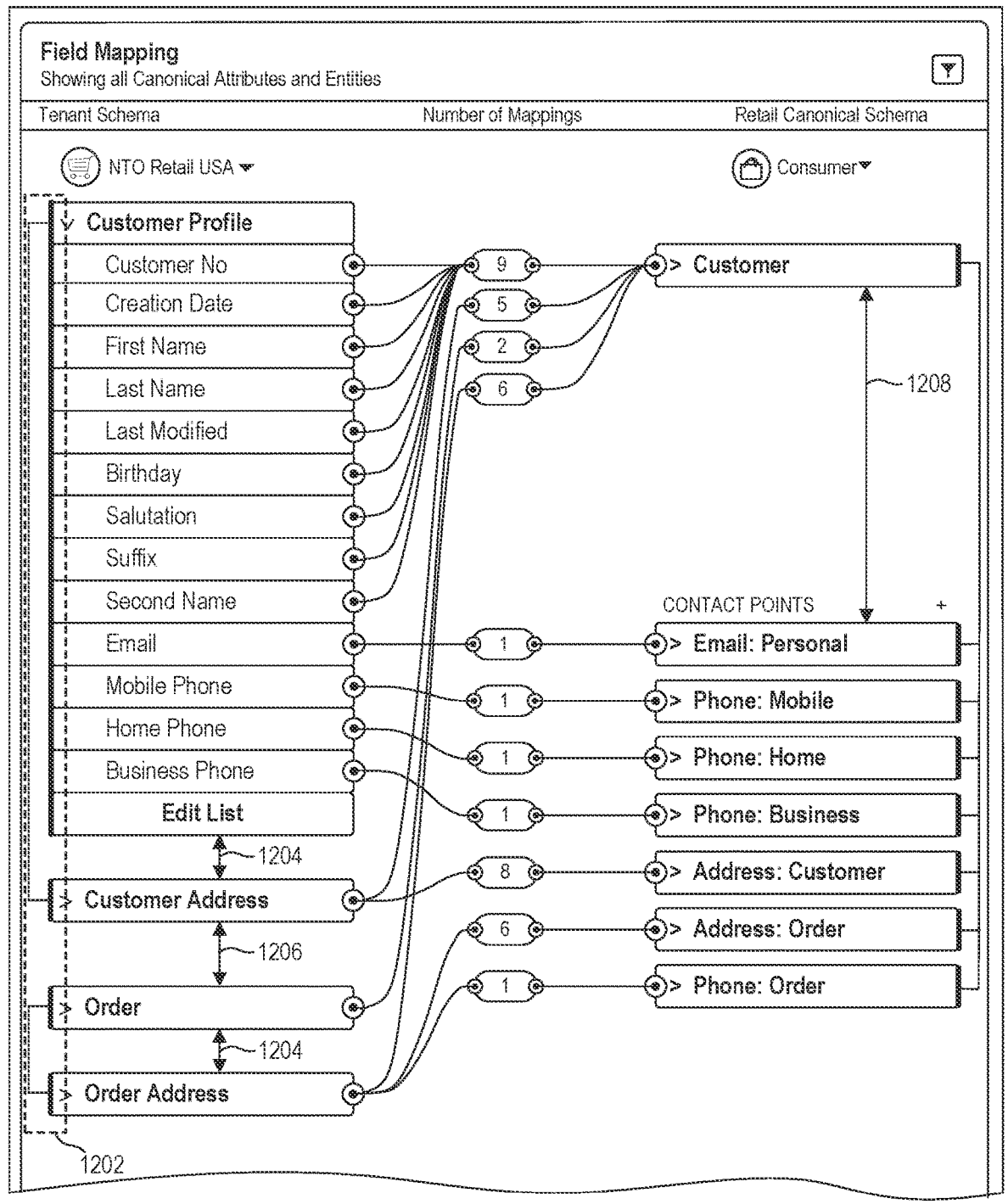
FIG. 12 illustrates a Data Mapping GUI screenshot showing an example of applied spacing logic, a "minimum spacing rule," according to some embodiments.

FIG. 12 illustrates a Data Mapping GUI screenshot 1200 showing an example of applied spacing logic, a "minimum spacing rule," according to some embodiments. The goal of the applied spacing logic is to display as many straight lines as possible while keeping each field on one side of the Data Mapping GUI as close to its mapped field on the opposite side of the GUI as possible. This affects the "minimum spacing rule." The "minimum spacing rule" has two parts, illustrated as examples in FIG. 12: (1) each object that is related to another object (for example, denoted by the lines 1202 connecting objects of the data source schema) can be no more than "X-large" spacing 1204 from the object above it; and (2) objects that are not related can be no more than "XX-large" spacing 1206 from the object above it. The rule is applied to the schemas on both the left and right sides of the GUI. Yet, although the spacing 1208 is between two related entities of the canonical schema, the spacing 1208 is greater than "X-large" spacing to satisfy a "straight-line rule," discussed below.

Figure 13:
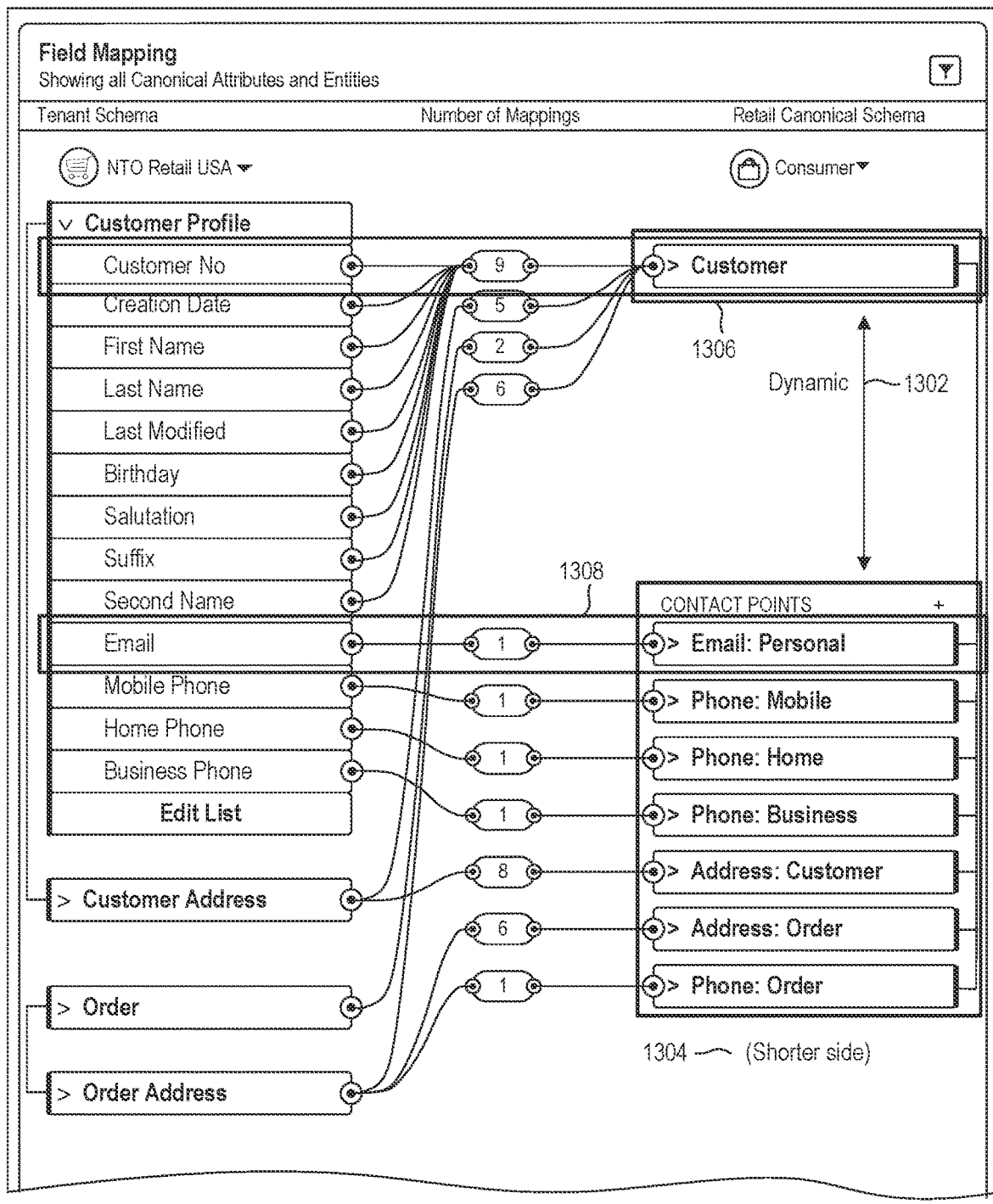
FIG. 13 illustrates a Data Mapping GUI screenshot showing another example of applied spacing logic, a "straight line rule," according to some embodiments.

FIG. 13 illustrates a Data Mapping GUI screenshot 1300 showing another example of applied spacing logic, a "straight line rule," according to some embodiments. Spacing between objects of one schema can also be determined based on whether a straight line can be created from a single mapping between two schemas. The more straight lines in a GUI view, the easier it will be for a user to understand. After automatic sorting, as discussed above, is carried out, a "straight line rule" is applied. This "straight line rule" says that if a straight line between two objects cannot be created, the objects connected to the line rearrange accordingly within the GUI to get the line as straight as possible, while still respecting the minimum spacing rule. This makes the setting of the space 1302 between these objects dynamic. Here, the straight line rule allows the mappings 1306, 1308 to be straight. The mappings below mapping 1308 can then become less visually complex also. The shorter side 1304 of the mappings can adopt the straight line rule and any additional spacing rules.

Figure 14:
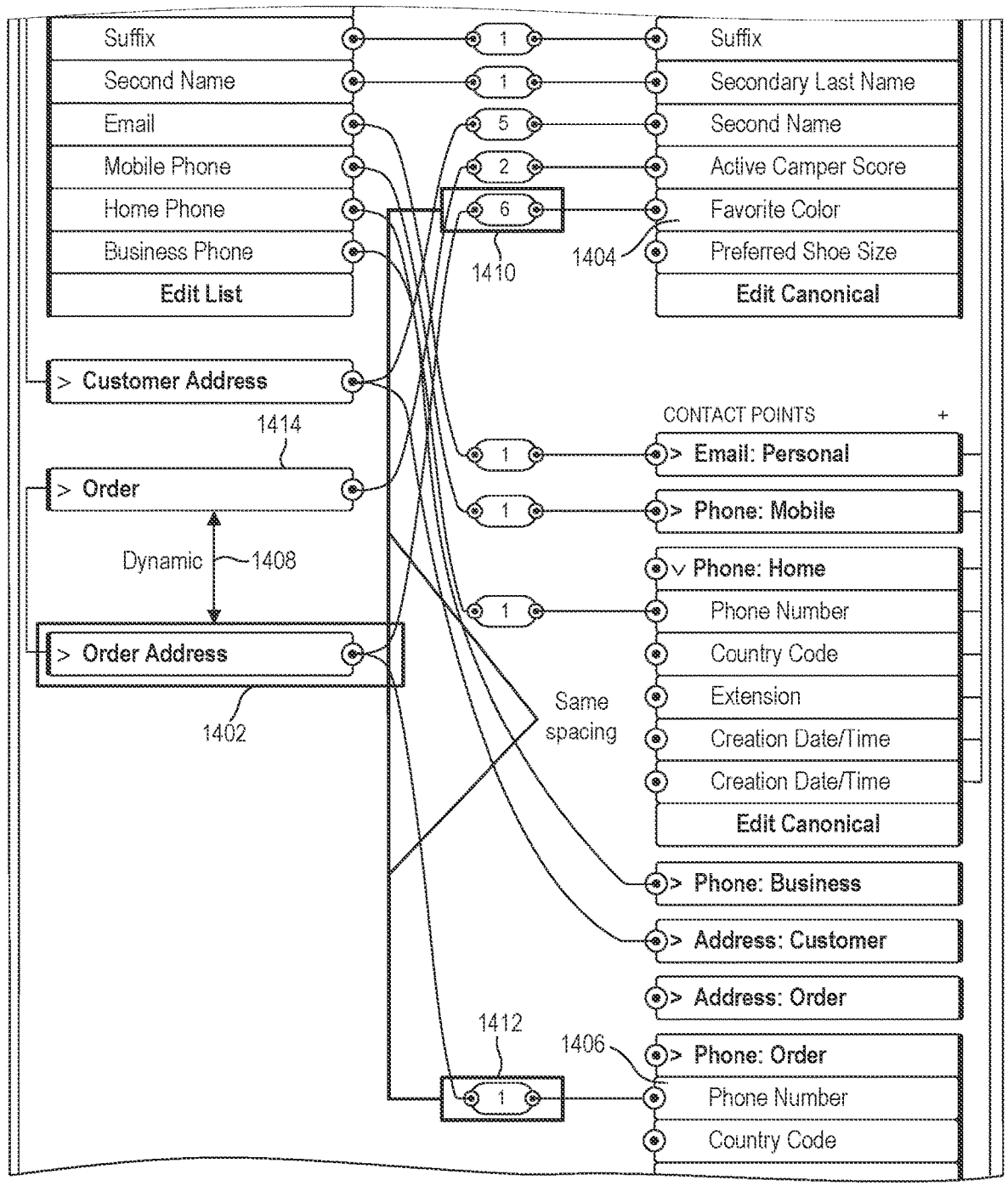
FIG. 14 illustrates a Data Mapping GUI screenshot showing another example of applied spacing logic, an "equal spacing rule," according to some embodiments.

FIG. 14 illustrates a Data Mapping GUI screenshot 1400 showing another example of applied spacing logic, an "equal spacing rule," according to some embodiments. In the case in which a straight line cannot be created from the straight line rule, and a field has more than one field mapped to it, the GUI can try to center the field between its highest and lowest mapping pills. This is the "equal spacing rule." Two exceptions to this rule are: (1) if centering the field breaks the minimum spacing rule, and/or (2) if one of the mapped fields is "open" (that is, expanded to show all entities in a group or all attributes as children of an entity) and the rest are "closed" (that is, collapsed to show only the entity or entity group name that has other fields as children). A field can be considered open if it is fully expanded but does not have a field under it as a child.

In the example of FIG. 14, "Order Address" 1402 cannot create a straight line by mapping to a relevant field, so the Data Mapping GUI checks whether "Order Address" 1402 has more than one field mapped to it. Here, two fields, "Favorite Color" 1404 and "Phone Number" 1406, are mapped to "Order Address" 1402, through pills 1410 and 1412, respectively. Next, the GUI checks to see whether one (but not both) of those fields is open. In this instance, both "Favorite Color" 1404 and "Phone Number" 1406 are open (expanded), so the second exception above does not hold.

Finally, the GUI calculates the spacing that it will need between "Order" 1414 and "Order Address" 1402 to execute the minimum spacing rule. In balancing the spacing rules and their exceptions, the spacing 1408 may be dynamic. Here, the spacing 1408 is greater than the minimum "X-large" spacing (as previously addressed in the description of FIG. 12), so the first exception does not hold. Because a straight line cannot be created from the straight line rule, "Order Address" 1402 has more than one field mapped to it, and neither exception applies, the GUI will execute the equal spacing rule and center "Order Address" 1402 between its highest pill 1410 and lowest pill 1412, so that there is the same spacing between them.

Figure 15:
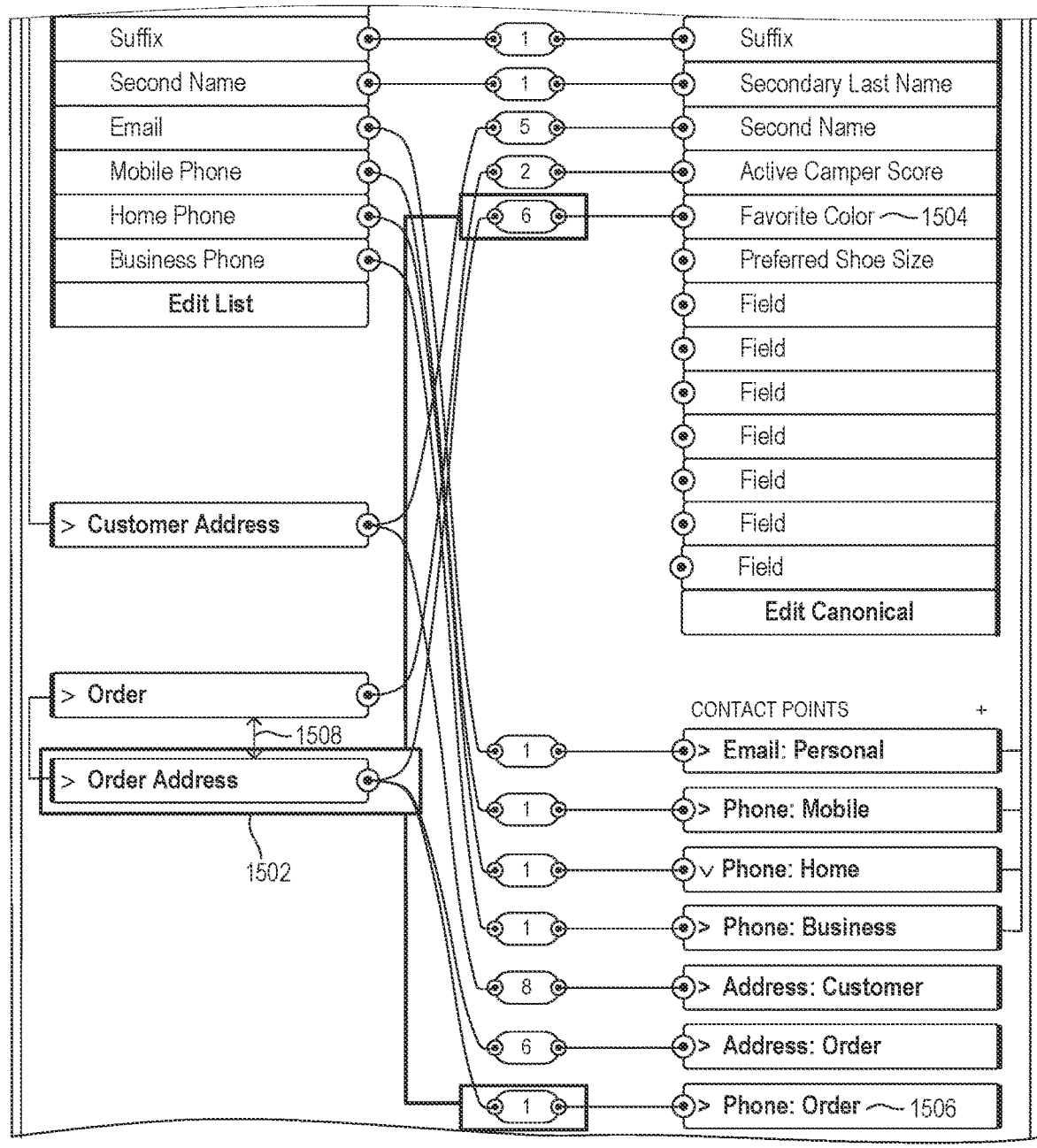
FIG. 15 illustrates a Data Mapping GUI screenshot showing an example of a first exception to the equal spacing rule, according to some embodiments.

FIG. 15 illustrates a Data Mapping GUI screenshot 1500 showing an example of the first exception to the equal spacing rule, according to some embodiments. As shown in FIG. 15, if a field does not have room to move and cannot evenly distribute, it will respect the minimum spacing between it and the field above it. For example, the object "Order Address" 1502, to center between its mapped fields "Favorite Color" 1504 and "Phone: Order" 1506, would normally have to move up. Because "Order Address" 1502 respects the order and minimum spacing, it stays in place and uses the "X-large" spacing 1508.

Figure 16:
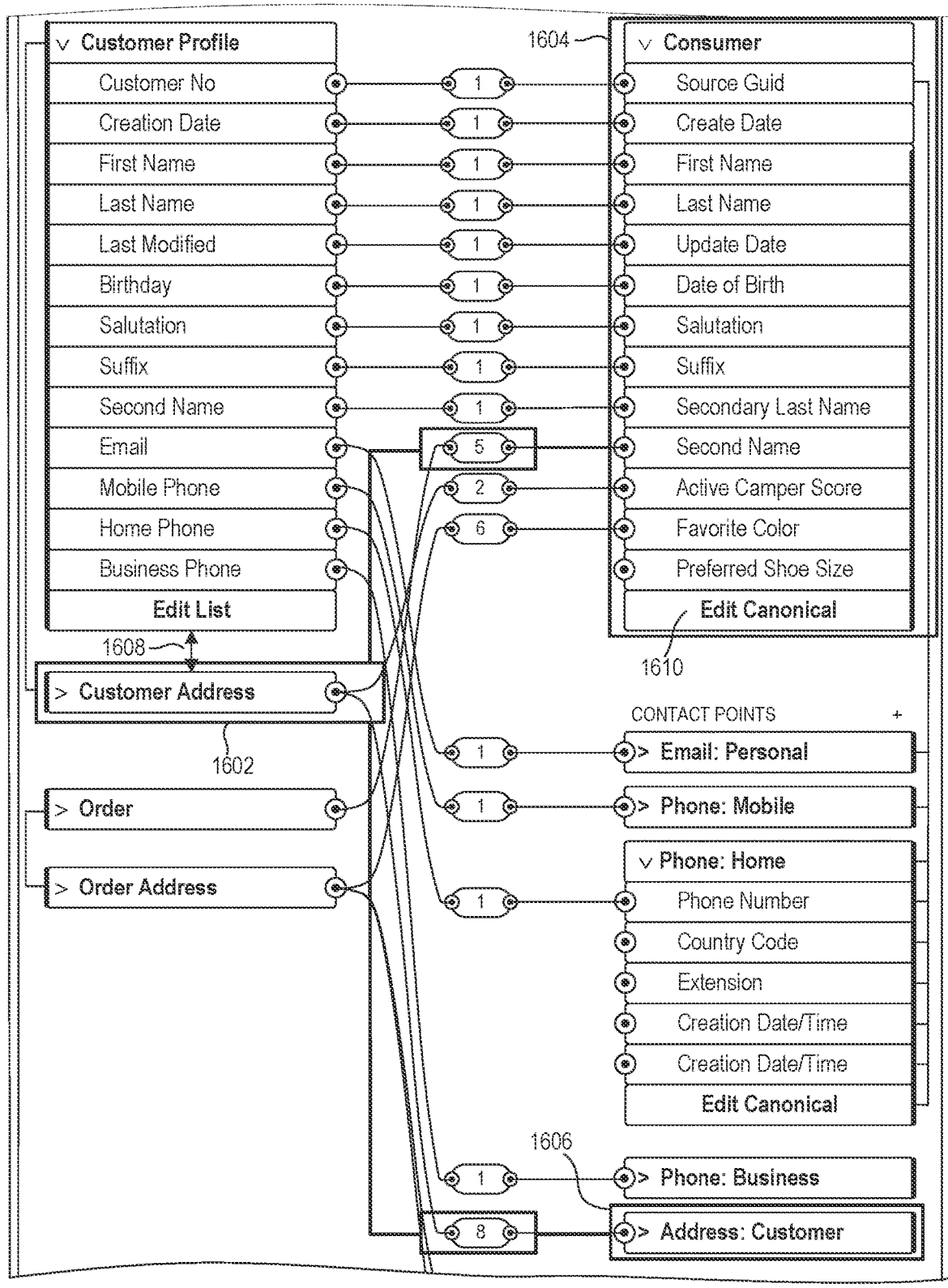
FIG. 16 illustrates a Data Mapping GUI screenshot showing an example of a second exception to the equal spacing rule, according to some embodiments.

FIG. 16 illustrates a Data Mapping GUI screenshot 1600 showing an example of the second exception to the equal spacing rule, according to some embodiments. As shown in FIG. 16, if the object "Customer Address" 1602 has a mapping to an open (expanded) field, it should respect the straight line rule. The GUI applies this exception because it is assumed that the customer cares about the expanded objects more than the collapsed ones. Here, the entity "Consumer" 1604 is open (that is, expanded to show all attributes under it), but "Address: Customer" 1606 is closed. This means that "Customer Address" 1602 should be closer to "Consumer" 1604. The spacing rule applied to "Customer Address" 1602 reverts back to the straight line rule. But because a line cannot be created, the location of "Customer Address" 1602 respects the minimum spacing of "X-large" spacing 1608.

Instance-Enabled Canonical Entities

Field mappings between data source objects to canonical entities are not always symmetric due to the denormalized nature of many of the potential objects that may be used in a schema. For example, a consumer may have multiple phone numbers stored, which can map to multiple instances of the entity storing contact points on a canonical data schema. This situation can be simplified in the canonical data schema using instance-enabled canonical entities. This can allow users to conceptually group fields that belong together, such as various types of contact information. Instances are specific to each tenant, and any change or addition to the instances does not affect the canonical data schema.

The fields on each individual instance of a canonical entity can be allowed a single mapping. Then, the user may, for example, collapse the entity group having multiple instances and later be able to return with ease to that single group in seeking an instance originating from any number of various schema objects.

Figure 17:
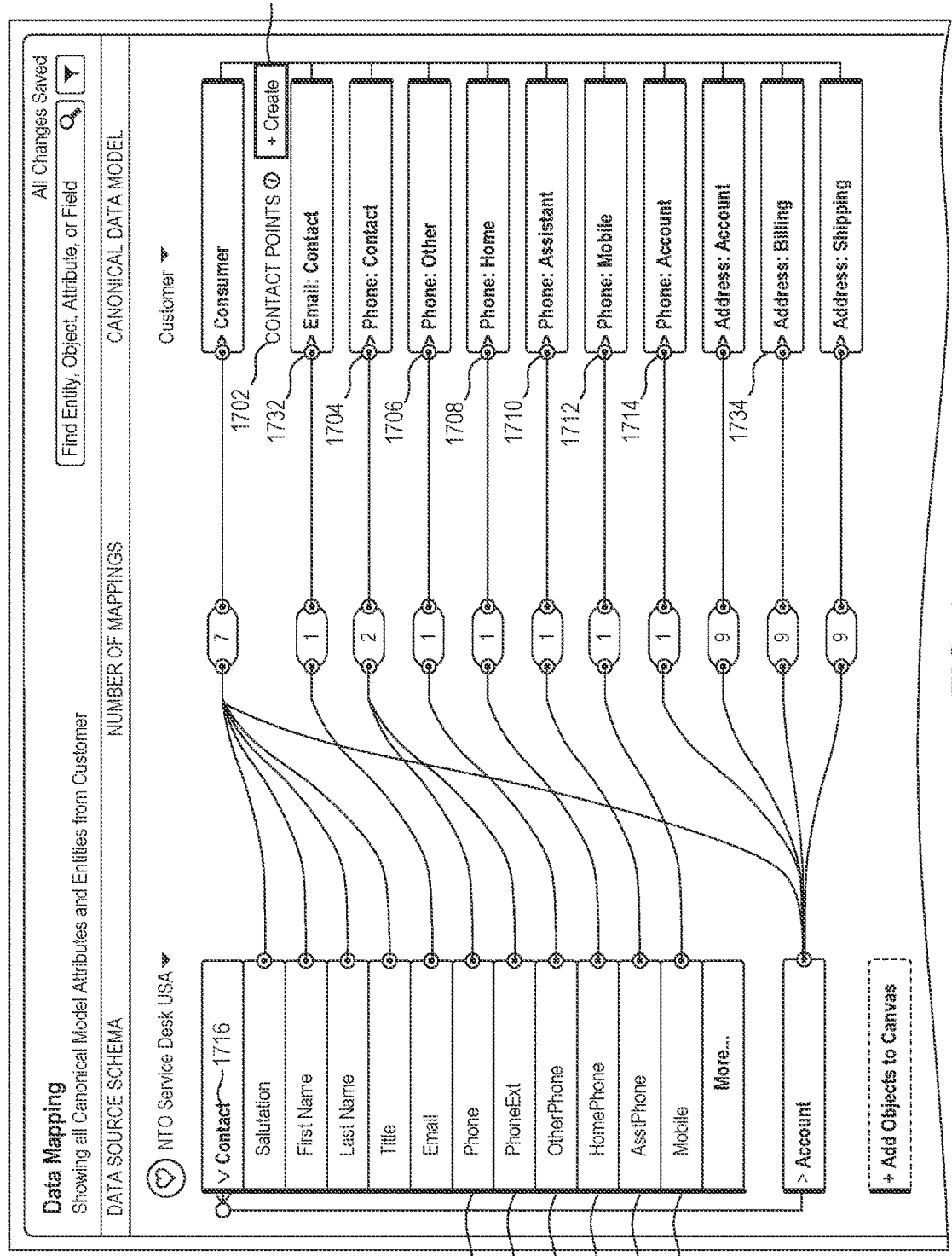
FIG. 17 illustrates a Data Mapping GUI screenshot showing an instance-enabled canonical entity and its mapping structure, according to some embodiments.

FIG. 17 illustrates a Data Mapping GUI screenshot 1700 showing an instance-enabled canonical entity and its mapping structure, according to some embodiments. Each instance can have what is called a "type." In FIG. 17, the entity "Contact Points" 1702 has a type of "Phone," "Email," and "Address," for example, and each of these types has an instance type. The format of the data is Contact Points Type: Instance Type, as shown in the "Contact Points" 1702 group. For example, type Phone has an instance type of Home, or "Phone: Home" 1708; type Email has an instance type of Contact, or "Email: Contact" 1732; and type Address has an instance type of Billing, or "Address: Billing" 1734. Depending on the type selected, a different set of fields can be available for mapping of that instance-enabled canonical entity.

For example, during the mapping process, each phone number type can be set up to have an instance of the instance-enabled entity "Contact Points" 1702 with the type Phone. Here, for a specific tenant, the instance types include Contact, Other, Home, Assistant, Mobile, and Account, for example. Therefore, available mappings to the canonical are, for example, "Phone: Contact" 1704, "Phone: Other" 1706, "Phone: Home" 1708, "Phone: Assistant" 1710, "Phone: Mobile" 1712, and "Phone: Account" 1714.

The various phone types can be mapped from a single field of the tenant object "Contact" 1716 to one of the instances of the canonical data schema with the type phone. For example, object "Phone" 1718 is mapped to "Phone: Contact" 1704; "PhoneExt" 1720 is mapped to "Phone: Contact" 1704; "OtherPhone" 1722 is mapped to "Phone: Other" 1706; "HomePhone" 1724 is mapped to "Phone: Home" 1708; "AsstPhone" 1726 is mapped to "Phone: Assistant" 1710; and "Mobile" 1728 is mapped to "Phone: Mobile" 1712.

Figure 18:
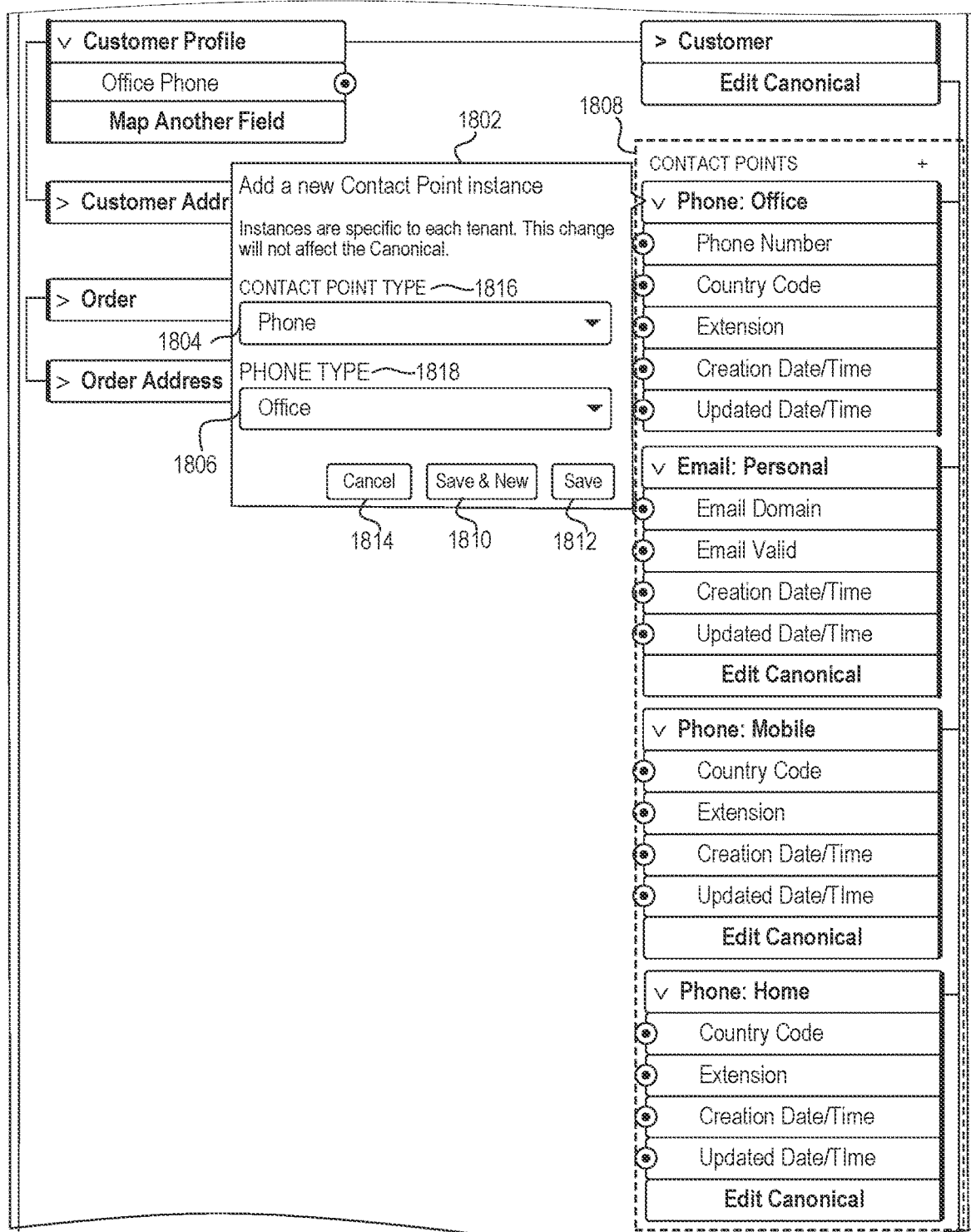
FIG. 18 illustrates a Data Mapping GUI screenshot showing an exemplary interface for creating an instance, according to some embodiments.

FIG. 18 illustrates a Data Mapping GUI screenshot 1800 showing an interface for creating an instance, according to some embodiments. Instances can be added to the canonical by clicking the "+ Create" button 1730 next to an entity that allows instances, such as "Contact Points" 1702 (see FIG. 17). When adding a new instance to an instance-enabled entity, such as "Contact Points" 1702, all of the different types can be displayed in the "Contact Point" dropdown menu 1802. The most recently selected Contact Point type 1816 can be displayed as the default entity type selection. Here, that is "Phone" 1804. Similarly, the most recently selected Phone type 1818 can be displayed as the default instance type selection: here, "Office" 1806.

To the side of the dropdown menu 1802 is a preview of the types 1808 showing the fields on the Data Mapping GUI. After making the selection of the entity type and its instance type, a user may save the instance. By clicking the button "Save & New" 1810, the instance can be saved to the canonical data schema, and the dropdown menu 1802 can remain, allowing the user to create another instance. By clicking the button "Save" 1812, the instance can be saved to the canonical data schema, and the dropdown menu 1802 can close. By clicking the button "Cancel" 1814, the dropdown menu 1802 can close without saving a new instance.

Add Fields to a Data Source Schema

FIG. 19 illustrates a Data Mapping GUI screenshot 1900 showing an interface for adding fields to a data source schema based on the available object attributes, according to some embodiments. Clicking on "Edit List" from any of the data source schema objects can animate the Data Mapping GUI to slide the data mappings over to the side, and slide in a table showing all of the attributes for that object. For example, a user can click on "Edit List" 964 at the end of the list of object fields under the specific object "Contact" 966, as shown in FIG. 9B, to reveal the complete attribute list 1906 for "Contact" 966, as shown in FIG. 19.

In FIG. 19, for example, the complete attribute list 1906 of the selected object "Contact" 1902 in the data source schema "NTO Service Desk New York" 1904 comes from the previously mapped data mappings to the entity "Consumer" 968. That is, all canonical model attributes from "Consumer" 968 become the possible attributes for the selected object "Contact" 1902, available for selection by the user via the complete attribute list 1906. The complete attribute list 1906 has a first column "Visible" 1908, indicating whether the attribute is selected to be visibly displayed in the Data Mapping GUI. The complete attribute list 1906 also lists the attribute label 1910 and its data type 1912.

The last column "System Attribute" 1914 indicates whether the attribute is global to all canonical users, that is, whether the attribute is required in a canonical ("True," indicating a system attribute), or whether the attribute is not required in a canonical ("False," indicating a non-system attribute).

The Data Mapping GUI can additionally provide the user the ability to search for a field within the complete attribute list 1906 by entering the name of the field into the "Find Field" search box 1916. Upon searching, the GUI will filter the complete attribute list 1906 and show only the search results having the found attribute(s) matching the search term within the complete attribute list 1906.

Add Objects to Data Source Schema Display

Figure 20:
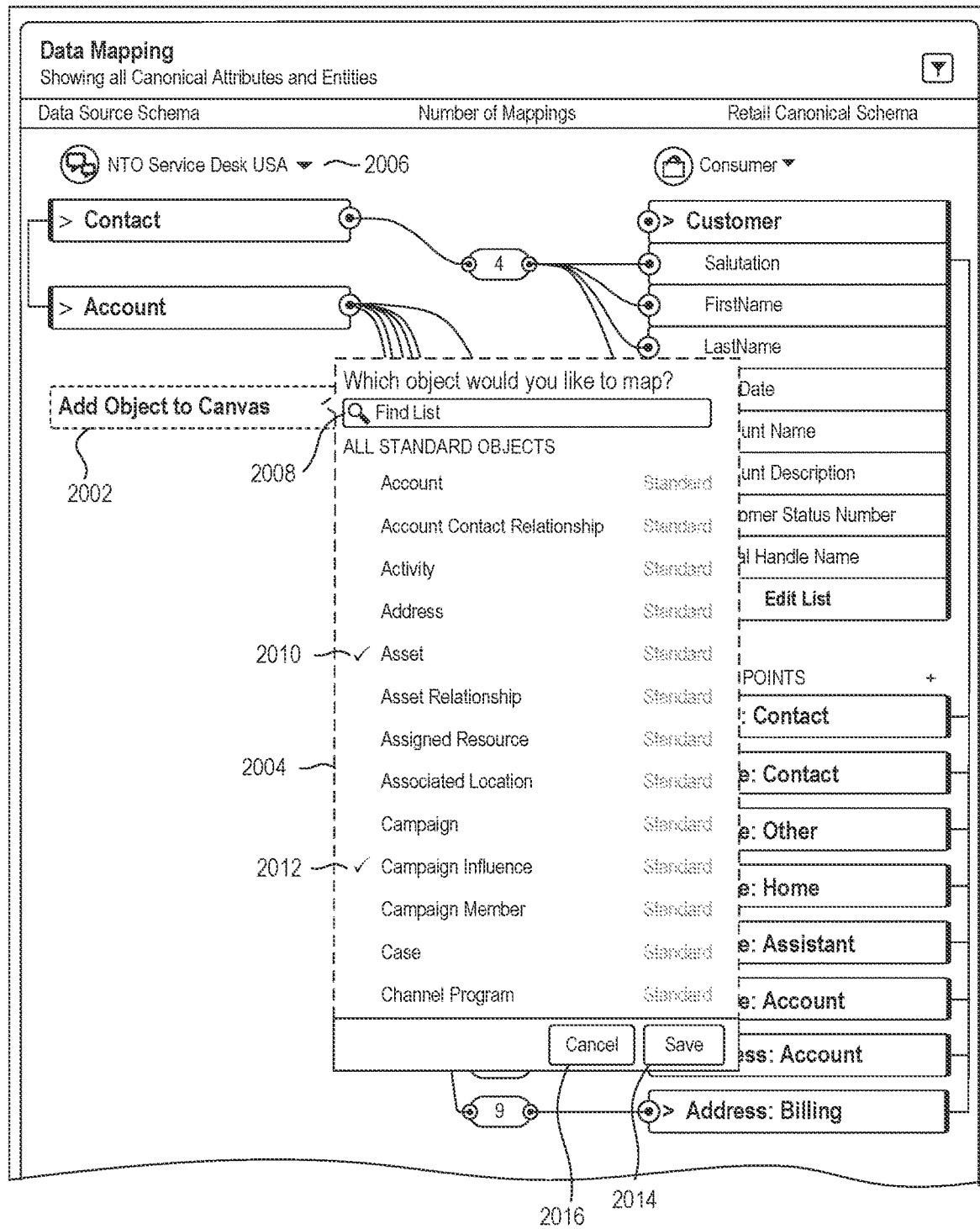
FIG. 20 illustrates a Data Mapping GUI screenshot showing an exemplary interface for adding objects from a data source schema to the GUI canvas, according to some embodiments.

FIG. 20 illustrates a Data Mapping GUI screenshot 2000 showing an interface for adding objects from a data source schema to the GUI canvas, according to some embodiments. Clicking on "Add Object to Canvas" 2002 causes the object selection panel 2004 to open. From the object selection panel 2004, the user can visually search for an object in the tenant data source schema "NTO Service Desk USA" 2006 by scrolling. The user can select multiple objects from the list at a time. Selecting an object with a point and click can add a checkmark to an object to indicate that the object had been selected, as shown for the objects "Asset" 2010 and "Campaign Influence" 2012. When the user is done selecting objects, the user can click the button "Save" 2014 to save the checked objects to the GUI canvas in their original location (relative to existing objects) within the data source schema. Clicking "Cancel" 2016 can close the object selection panel 2004 without adding any objects from the data source schema to the GUI canvas.

The user can also search for an object in the object selection panel 2004 using the "Find List" search box 2008. This search functionality can enable the GUI to filter the objects in the object selection panel 2004 and show only the search results having the found object(s) matching the search term. The user can then similarly click on the desired objects to select them (add a checkmark) and click the button "Save" 2014 to save the checked objects to the GUI canvas.

Add Attributes to a Canonical Data Model

In some embodiments, edit functionality may be applied to various parts of a data schema. A button to activate an editing process can be placed and named in relation to the object list or entity list for which it applies. For example, as shown in FIG. 16, "Edit Canonical" 1610 may be a button under a part of a canonical data schema. Edit functionality can then be focused on that part of a canonical data schema, which may include only a small part of the schema at a time. This allows the user to more easily view and manage parts of the schema.

FIG. 21 illustrates a Data Mapping GUI screenshot 2100 showing an interface for adding existing attributes as new fields to the displayed canonical data model on the GUI canvas, according to some embodiments. Clicking on "Edit List" from any of the canonical entities can animate the Data Mapping GUI to slide the data mappings over to the side, and slide in a table showing all of the attributes for that entity. For example, a user can click on "Edit List" 970 at the end of the list of entity fields under the specific entity "Consumer" 968, as shown in FIG. 9B, to reveal a complete attribute list.

FIG. 21 shows the complete attribute list 2102 of the selected entity "Individual" 2104 of the entity group "Consumer" 2106 of the canonical data model. The complete attribute list 2102 has a first column "Visible" 2108, indicating whether the attribute is selected to be visibly displayed in the Data Mapping GUI. A checkmark 2118 indicates that the attribute will be visibly displayed. A checkmark cannot be removed until all mappings to the checkmarked attribute are removed.

The complete attribute list 2102 also lists the attribute label 2110 and its data type 2112, for example, string, ID, or Date/Time. The last column "Description" 2114 provides a description of each attribute. For example, a user may enter notes to help define the attribute, such as "A customer's last name" 2120 to define the attribute "LastName" 2122.

The Data Mapping GUI can additionally provide the user the ability to search for an attribute within the complete attribute list 2102 by entering the name of the attribute into the "Find Attribute" search box 2116. Upon searching, the GUI will filter the complete attribute list 2102 and show only the search results having the found attribute(s) matching the search term within the complete attribute list 2102.

Figure 22:
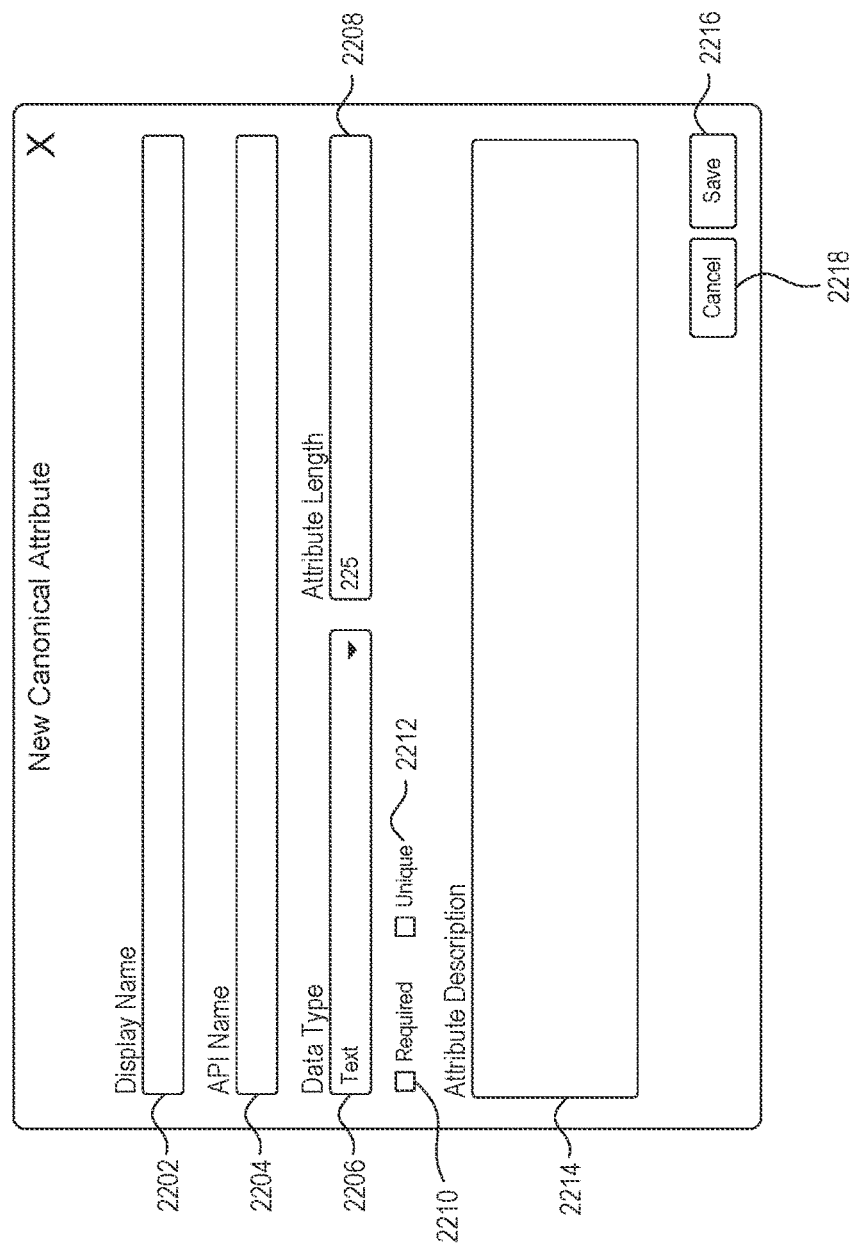
FIG. 22 illustrates a canonical editor for creating a new canonical attribute, according to some embodiments.

FIG. 22 illustrates a canonical editor 2200 for creating a new canonical attribute, according to some embodiments. The Data Mapping GUI, via the canonical editor 2200, can enable a user to add a new attribute to the canonical data model. The canonical editor 2200 can include data entry boxes for the user to set a number of parameters about the attribute, including, for example, display name 2202, API name 2204, data type 2206, attribute length 2208, a "Required" checkbox 2210 to indicate whether the attribute is required to be used in a canonical due to a dependency within the system, a "Unique" checkbox 2212 to indicate whether the attribute data is constrained to contain unique data values, and an attribute description 2214. Once the parameters are entered, the user can click "Save" 2216 to save the new canonical attribute. The user can also click "Cancel" 2218 to close the canonical editor 2200 without saving a new canonical attribute.

Filtering and Searching a Data Schema

Figure 23:
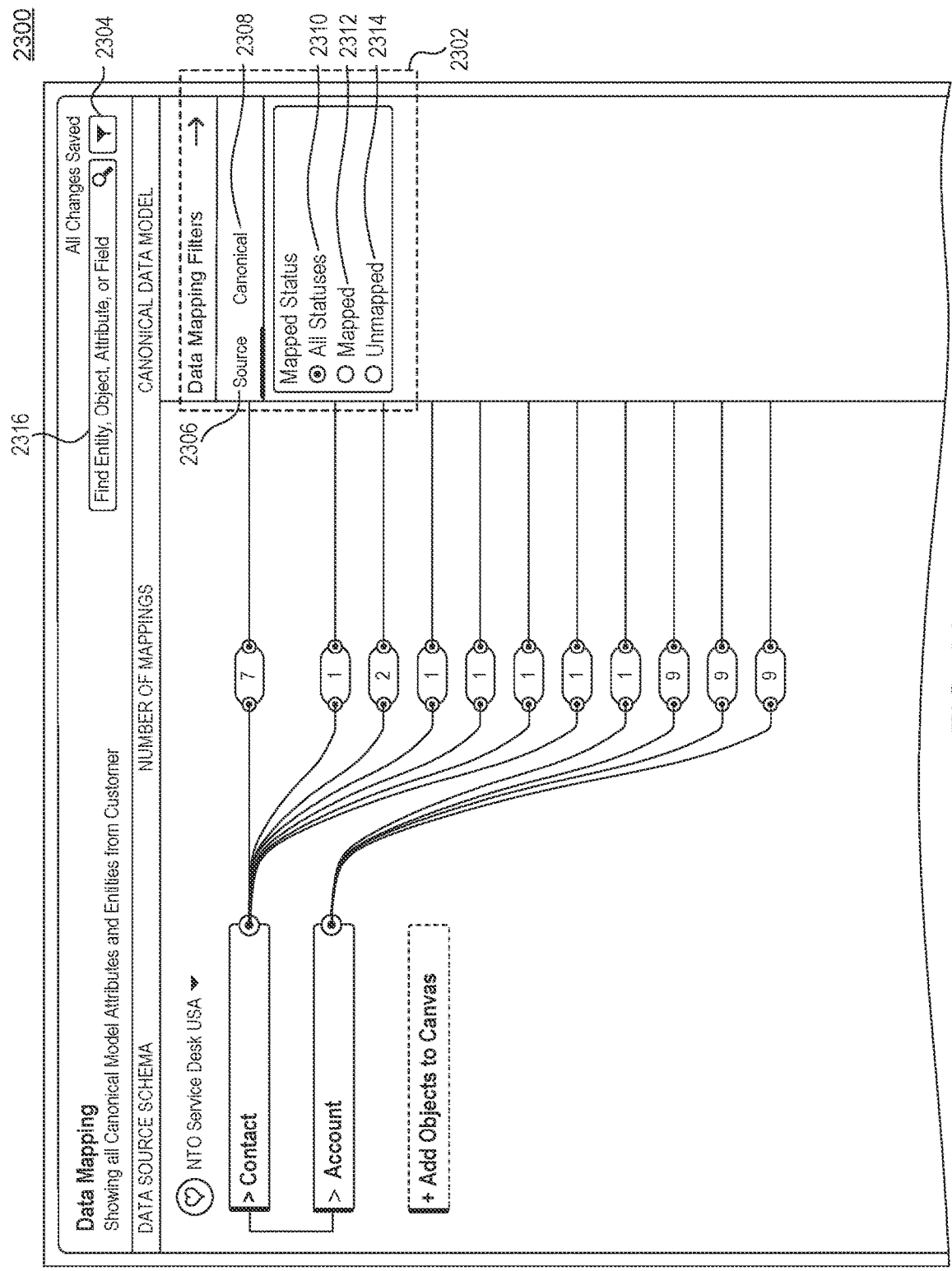
FIG. 23 illustrates a Data Mapping GUI screenshot showing a data mapping filter selector, according to some embodiments.

FIG. 23 illustrates a Data Mapping GUI screenshot 2300 showing a data mapping filter selector 2302, according to some embodiments. Within the Data Mapping GUI, a user can click on the filter icon 2304 to open the data mapping filter selector 2302. The data mapping filter selector 2302 allows the user to filter a schema displayed in the Data Mapping GUI (here, selected by either the source tab 2306 or the canonical tab 2308) to show fields of the selected schema according to the status of the data mappings. For example, if "All Statuses" 2310 is selected, the schema displayed in the GUI will show all fields currently in the schema. If "Mapped" 2312 is selected, the schema displayed in the GUI will show all mapped fields currently in the schema. If "Unmapped" 2314 is selected, the schema displayed in the GUI will show all unmapped fields currently in the schema. The user can switch between the two schemas by clicking on the other of the source tab 2306 or the canonical tab 2308, for example.

The user can also search for an entity, object, attribute, or field in the Data Mapping GUI, from the schemas that are loaded into the GUI, by entering a search term in the "Find Entity, Object, Attribute, or Field" search box 2316.

Computer System Implementation

Various embodiments may be implemented using one or more well-known computer systems, such as computer system 2400 shown in FIG. 24. One or more computer systems 2400 may be used, for example, to implement any of the embodiments discussed herein, as well as combinations and sub-combinations thereof.

Computer system 2400 may include one or more processors (also called central processing units, or CPUs), such as a processor 2404. Processor 2404 may be connected to a communication infrastructure or bus 2406.

Computer system 2400 may also include user input/output device(s) 2403, such as monitors, keyboards, pointing devices, etc., which may communicate with communication infrastructure 2406 through user input/output interface(s) 2402.

One or more of processors 2404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 2400 may also include a main (or primary) memory 2408, such as random access memory (RAM). Main memory 2408 may include one or more levels of cache. Main memory 2408 may have stored therein control logic (i.e., computer software) and/or data.

Computer system 2400 may also include one or more secondary storage devices or memory 2410. Secondary memory 2410 may include, for example, a hard disk drive 2412 or a removable storage device or drive 2414. Removable storage drive 2414 may be a floppy disk drive, a magnetic tape drive, a compact disk drive, an optical storage device, tape backup device, or any other storage device/drive.

Removable storage drive 2414 may interact with a removable storage unit 2418. Removable storage unit 2418 may include a computer usable or readable storage device having stored thereon computer software (control logic) or data. Removable storage unit 2418 may be a floppy disk, magnetic tape, compact disk, DVD, optical storage disk, or any other computer data storage device. Removable storage drive 2414 may read from or write to removable storage unit 2418.

Secondary memory 2410 may include other means, devices, components, instrumentalities, or other approaches for allowing computer programs or other instructions or data to be accessed by computer system 2400. Such means, devices, components, instrumentalities, or other approaches may include, for example, a removable storage unit 2422 and an interface 2420. Examples of the removable storage unit 2422 and the interface 2420 may include a program cartridge and cartridge interface (such as that found in video game devices), a removable memory chip (such as an EPROM or PROM) and associated socket, a memory stick and USB port, a memory card and associated memory card slot, or any other removable storage unit and associated interface.

Computer system 2400 may further include a communications or network interface 2424. Communications interface 2424 may enable computer system 2400 to communicate and interact with any combination of external devices, external networks, external entities, etc. (individually and collectively referenced by reference number 2428). For example, communications interface 2424 may allow computer system 2400 to communicate with external or remote devices 2428 over communications path 2426, which may be wired or wireless (or a combination thereof), and which may include any combination of LANs, WANs, the Internet, etc. Control logic or data may be transmitted to and from computer system 2400 via communications path 2426.

Computer system 2400 may also be any of a personal digital assistant (PDA), desktop workstation, laptop or notebook computer, netbook, tablet, smart phone, smart watch or other wearable, appliance, part of the Internet-of-Things, or embedded system, to name a few non-limiting examples, or any combination thereof.

Computer system 2400 may be a client or server, accessing or hosting any applications or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); or a hybrid model including any combination of the foregoing examples or other services or delivery paradigms.

Any applicable data structures, file formats, and schemas in computer system 2400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 2400, main memory 2408, secondary memory 2410, and removable storage units 2418 and 2422, as well as tangible articles of manufacture embodying any combination of the foregoing. Such control logic, when executed by one or more data processing devices (such as computer system 2400), may cause such data processing devices to operate as described herein.

Based on the teachings contained in this disclosure, it will be apparent to persons skilled in the relevant art(s) how to make and use embodiments of this disclosure using data processing devices, computer systems, or computer architectures other than that shown in FIG. 24. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, or entities illustrated in the figures or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an exemplary embodiment," or similar phrases, indicate that the embodiment described can include a particular feature, structure, or characteristic, but every embodiment cannot necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected," along with their derivatives. These terms are not necessarily intended as synonyms for each other. For example, some embodiments can be described using the terms "connected" or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method, comprising:
   providing, by one or more computing devices, concurrent views of a first data schema and a second data schema in a graphical user interface (GUI), wherein the second data schema is different from the first data schema;
   mapping, by the one or more computing devices, data from a first object of the first data schema to a second object of the second data schema with a first mapping, wherein the first data schema comprises first and second data sources having different data schemas, each of the first and second data sources comprises same data related to the first object, and the second data schema comprises the same data mapped from the first object of the first data schema;
   connecting, by the one or more computing devices, the first object of the first data schema to the second object of the second data schema with a visual logic connector to show the first mapping of the data from the first object to the second object in the GUI, wherein the visual logic connector is one of a plurality of visual logic connectors connecting between the first data schema and the second data schema;
   displaying, by the one or more computing devices, a first number on the first object that indicates a first quantity of attributes mapped to the second schema in the GUI;
   displaying, by the one or more computing devices, a second number on the second object that indicates a second quantity of attributes mapped from the first schema in the GUI;
   ordering, by the one or more computing devices, at least one of the first object in the first data schema and the second object in the second data schema to reduce a quantity of crossovers of the plurality of visual logic connectors between the first data schema and the second data schema; and
   displaying, by the one or more computing devices, the ordered first object and the ordered second object mapped with the visual logic connector in the GUI.

2. The method of claim 1, wherein the second data schema is a canonical data model having a composite of data structures, related and grouped under a plurality of entity groups.

3. The method of claim 2, wherein the ordering comprises:
   ordering, by the one or more computing devices, additional data mappings connecting additional objects of the first data schema to the plurality of entity groups of the second data schema to increase a quantity of straight lines of additional visual logic connectors of the additional data mappings.

4. The method of claim 1, further comprising:
   mapping, by the one or more computing devices, the first object of the first data schema to a third object of the second data schema with a second mapping,
   wherein the ordering comprises:
   arranging, by the one or more computing devices, the second mapping with the first mapping to reduce a quantity of crossovers between a visual logic connector of the second mapping and the visual logic connector of the first mapping; and
   arranging, by the one or more computing devices, the second mapping with the first mapping to increase a quantity of straight lines of the visual logic connector of the second mapping and the visual logic connector of the first mapping.

5. The method of claim 1, further comprising:
   displaying, within the visual logic connector, a third number indicating a third quantity of attributes mapped with the visual logic connector from the first object to the second object.

6. The method of claim 1, further comprising:
   providing, by the one or more computing devices, a transformation rule interface to display a transformation rule associated with a corresponding mapped field of the mapped fields and an editing interface to permit edits to the transformation rule.

7. The method of claim 1, wherein the second object is collapsed, further comprising:
   expanding, by the one or more computing devices, the collapsed second object to an expanded second object to show the plurality of visual logic connectors between mapped fields in the first object to mapped fields in the expanded second object.

8. The method of claim 7, further comprising:
   rearranging, by the one or more computing devices, the mapped fields of the expanded second object to increase a quantity of straight lines or reduce a quantity of crossovers of the plurality of visual logic connectors.

9. The method of claim 1, further comprising:
   mapping, by the one or more computing devices, the first object of the first data schema to a third object of the second data schema with a second mapping, wherein the visual logic connector of the first mapping of the first object of the first data schema to the second object of the second data schema and of a visual logic connector of the second mapping of the first object of the first data schema to the third object of the second data schema is equidistant from the first object in the GUI.

10. The method of claim 1, further comprising:
filtering, by the one or more computing devices, the first data schema or the second data schema to display mapped or unmapped fields.

11. A system, comprising:
a memory; and
at least one processor coupled to the memory, wherein the at least one processor is configured to:
provide concurrent views of a first data schema and a second data schema in a graphical user interface (GUI), wherein the second data schema is different from the first data schema;
map data from a first object of the first data schema to a second object of the second data schema with a first mapping, wherein the first data schema comprises first and second data sources having different data schemas, each of the first and second data sources comprises same data related to the first object, and the second data schema comprises the same data mapped from the first object of the first data schema;
connect the first object of the first data schema to the second object of the second data schema with a visual logic connector to show the first mapping of the data from the first object to the second object in the GUI, wherein the visual logic connector is one of a plurality of visual logic connectors connecting between the first data schema and the second data schema;
display a first number on the first object that indicates a first quantity of attributes mapped to the second schema in the GUI;
display a second number on the second object that indicates a second quantity of attributes mapped from the first schema in the GUI;
order at least one of the first object in the first data schema and the second object in the second data schema to reduce a quantity of crossovers of the plurality of visual logic connectors between the first data schema and the second data schema; and
display the ordered first object and the ordered second object mapped with the visual logic connector in the GUI.

12. The system of claim 11, wherein the at least one processor is further configured to:
map the first object of the first data schema to a third object of the second data schema with a second mapping,
wherein to order at least one of the first object of the first data schema and the second object of the second data schema, the at least one processor is further configured to:
arrange the second mapping with the first mapping to reduce a quantity of crossovers between a visual logic connector of the second mapping and the visual logic connector of the first mapping; and
arrange the second mapping with the first mapping to increase a quantity of straight lines of the visual logic connector of the second mapping and the visual logic connector of the first mapping.

13. The system of claim 11, wherein the at least one processor is further configured to:
order additional data mappings connecting additional objects of the first data schema to a plurality of entity groups of the second data schema to increase a quantity of straight lines of additional visual logic connectors of the additional data mappings.

14. The system of claim 11, wherein the at least one processor is further configured to:
display, within the visual logic connector, a third number indicating a third quantity of attributes mapped with the visual logic connector from the first object to the second object.

15. The system of claim 11, wherein the second object is collapsed and the at least one processor is further configured to:
enable expanding of the collapsed second object to an expanded second object to show the plurality of visual logic connectors between mapped fields in the first object to mapped fields in the expanded second object; and
rearrange the mapped fields of the expanded second object to increase a quantity of straight lines or reduce a quantity of crossovers of the plurality of visual logic connectors.

16. The system of claim 11, wherein the at least one processor is further configured to:
enable a second mapping of the first object of the first data schema to a third object of the second data schema,
wherein the at least one processor is further configured to display the visual logic connector of the first mapping of the first object of the first data schema to the second object of the second data schema and of a visual logic connector of the second mapping of the first object of the first data schema to the third object of the second data schema to be equidistant from the first object in the GUI.

17. A tangible non-transitory computer-readable device having instructions stored thereon that, when executed by a computing device, cause the computing device to perform operations comprising:
providing concurrent views of a first data schema and a second data schema in a graphical user interface (GUI), wherein the second data schema is different from the first data schema;
mapping data from a first object of the first data schema to a second object of the second data schema with a first mapping, wherein the first data schema comprises first and second data sources having different data schemas, each of the first and second data sources comprises same data related to the first object, and the second data schema comprises the same data mapped from the first object of the first data schema;
connecting the first object of the first data schema to the second object of the second data schema with a visual logic connector to show the first mapping of the data from the first object to the second object in the GUI, wherein the visual logic connector is one of a plurality of visual logic connectors connecting between the first data schema and the second data schema;
displaying a first number on the first object that indicates a first quantity of attributes mapped to the second schema in the GUI;
displaying a second number on the second object that indicates a second quantity of attributes mapped from the first schema in the GUI;
ordering at least one of the first object in the first data schema and the second object in the second data schema to reduce a quantity of crossovers of the plurality of visual logic connectors between the first data schema and the second data schema; and displaying the ordered first object and the ordered second object mapped with the visual logic connector in the GUI.

18. The tangible non-transitory computer-readable device of claim 17, the operations performed by the computing device further comprising:

mapping the first object of the first data schema to a third object of the second data schema with a second mapping, wherein the ordering by the computing device comprises:

arranging the second mapping with the first mapping to reduce a quantity of crossovers between a visual logic connector of the second mapping and the visual logic connector of the first mapping; and arranging the second mapping with the first mapping to increase a quantity of straight lines of the visual logic connector of the second mapping and the visual logic connector of the first mapping.

19. The tangible non-transitory computer-readable device of claim 17, the operations performed by the computing device further comprising:

ordering additional data mappings connecting additional objects of the first data schema to a plurality of entity groups of the second data schema to increase a quantity of straight lines of additional visual logic connectors of the additional data mappings.

20. The tangible non-transitory computer-readable device of claim 17, the operations performed by the computing device further comprising:

displaying, within the visual logic connector, a third number indicating a third quantity of attributes mapped with the visual logic connector from the first object to the second object.

* * * * *